(12) United States Patent
Spagnola et al.

(10) Patent No.: US 10,965,773 B2
(45) Date of Patent: Mar. 30, 2021

(54) ADAPTIVE SYSTEM CACHE

(71) Applicant: Pearson Education, Inc., Bloomington, MN (US)

(72) Inventors: Perry M. Spagnola, Phoenix, AZ (US); Mark DeLeon, Litchfield Park, AZ (US)

(73) Assignee: PEARSON EDUCATION, INC., New York, NY (US)

( * ) Notice: Subject to any disclaimer, the term of this patent is extended or adjusted under 35 U.S.C. 154(b) by 0 days.

(21) Appl. No.: 16/424,342

(22) Filed: May 28, 2019

(65) Prior Publication Data

US 2019/0281130 A1 Sep. 12, 2019

Related U.S. Application Data

(63) Continuation of application No. 14/878,870, filed on Oct. 8, 2015, now abandoned.

(51) Int. Cl.
*G06F 15/167* (2006.01)
*H04L 29/08* (2006.01)
(Continued)

(52) U.S. Cl.
CPC ...... *H04L 67/2852* (2013.01); *G06F 12/0862* (2013.01); *G06F 2212/6026* (2013.01);
(Continued)

(58) Field of Classification Search
CPC ..... H04L 67/2852; H04L 67/02; H04L 67/22; H04L 67/32; G09B 1/00; G06F 12/0862; G06F 2212/6026
(Continued)

(56) References Cited

U.S. PATENT DOCUMENTS

2002/0188954 A1\* 12/2002 Matous .................. G06F 16/40
  725/109
2005/0086188 A1\* 4/2005 Hillis ..................... G09B 19/00
  706/50
(Continued)

OTHER PUBLICATIONS

Cheung et al, "Predicting user acceptance of collaborative technologies: An extension of the technology acceptance model for e-learning", 2012, Elsevier, vol. 63, Apr. 2013, pp. 160-175 (Year: 2013).\*

(Continued)

*Primary Examiner* — Taylor A Elfervig
(74) *Attorney, Agent, or Firm* — Quarles & Brady LLP

(57) ABSTRACT

Techniques described herein relate to requesting and receiving adaptive content resources from content management servers and other content repositories, executing the adaptive content resources on one or more user devices, and performing caching determinations and caching behaviors based on the execution of the adaptive content resources. In some embodiments, content resources may be executed on user devices in a content distribution network. User inputs may be received in connection with the execution of the adaptive content resources, and a user context may be determined based on user interactions and feedback during execution of the adaptive content resources. Additional content resources may be requested and received from content repositories for caching within user devices based on the determined user context.

18 Claims, 21 Drawing Sheets

(51) Int. Cl.
  *G09B 1/00* (2006.01)
  *G06F 12/0862* (2016.01)

(52) U.S. Cl.
  CPC ............... *G09B 1/00* (2013.01); *H04L 67/02* (2013.01); *H04L 67/22* (2013.01); *H04L 67/32* (2013.01)

(58) Field of Classification Search
  USPC ........................................................ 709/213
  See application file for complete search history.

(56) References Cited

U.S. PATENT DOCUMENTS

| | | | | |
|---|---|---|---|---|
| 2008/0163047 | A1* | 7/2008 | Gossweiler | G06F 16/40 715/277 |
| 2011/0246645 | A1* | 10/2011 | Martin | G09B 7/02 709/224 |
| 2014/0115114 | A1* | 4/2014 | Garmark | H04N 21/47202 709/219 |
| 2014/0282013 | A1* | 9/2014 | Amijee | G06F 3/0482 715/732 |
| 2016/0110061 | A1* | 4/2016 | Low | G06F 3/04817 715/772 |
| 2016/0316268 | A1* | 10/2016 | Carmichael | H04N 21/812 |

OTHER PUBLICATIONS

Castro F., Vellido A., Nebot À., Mugica F. (2007) Applying Data Mining Techniques to e-Learning Problems. In: Jain L.C., Tedman R.A., Tedman D.K. (eds) Evolution of Teaching and Learning Paradigms in Intelligent Environment. Studies in Computational Intelligence, vol. 62. Springer, Berlin, Heidelberg (Year: 2007).*

S. Eom, "Relationships between E-Learning Systems and Learning Outcomes: A Path Analysis Model," 2010 10th IEEE International Conference on Advanced Learning Technologies, Sousse, 2010, pp. 516-520, (Year: 2010).*

* cited by examiner

Example Content Resources To Cache – User A

1010

| Content Resource ID | Name | Size | User A – Usage Prob. | User A - Est. Completion Time |
|---|---|---|---|---|
| xxxxxxx | Course A – Module 3 | 12 GB | 35.5% | 2.5 hrs |
| xxxxxxx | Course A – Module 4 | 15 GB | 28.6% | 3.3 hrs |
| xxxxxxx | Course B – Module 1 | 62 GB | 21.4% | 5.6 hrs |
| xxxxxxx | Course C – Module 6 | 24 GB | 17.3% | 0.8 hrs |
| xxxxxxx | Course C – Module 7 | 62 GB | 10.8% | 2.7 hrs |
| xxxxxxx | Course A – Module 2 | 24 GB | 9.4% | 7.5 hrs |

FIG. 10A

Example Content Resources To Cache – User B

1020

| Content Resource ID | Name | Size | User B – Usage Prob. | User A - Est. Completion Time |
|---|---|---|---|---|
| xxxxxxx | Program A – Episode 9 | 7.3 GB | 95.3% | 0.8 hrs |
| xxxxxxx | Program A – Episode 10 | 7.7 GB | 88.6% | 0.8 hrs |
| xxxxxxx | Program A – Episode 11 | 7.6 GB | 81.1% | 0.8 hrs |
| xxxxxxx | Program A – Episode 12 | 7.1 GB | 34.3% | 0.8 hrs |
| xxxxxxx | Program A – Episode 13 | 7.2 GB | 30.5% | 0.8 hrs |
| xxxxxxx | Movie A | 26 GB | 1.4% | 2.4 hrs |

FIG. 10B

Example Content Resources To Cache – User C

1030

| Content Resource ID | Name | Size | User A – Usage Prob. | User A - Est. Completion Time |
|---|---|---|---|---|
| xxxxxxx | Game 1 – Level 16 | 51 GB | 88.4% | 1.5 hrs |
| xxxxxxx | Game 1 – Level 15 | 46 GB | 75.4% | 23.3 hrs |
| xxxxxxx | Game 1 – Level 17 | 56 GB | 9.6% | 25.8 hrs |
| xxxxxxx | Game 1 – Level 18 | 78 GB | 7.5% | 45.3 hrs |
| xxxxxxx | Game 1 – Level 14 | 52 GB | 5.3% | 23.7 hrs |
| xxxxxxx | Game 2 – Level 1 | 46 GB | 2.3% | 2.5 hrs |

FIG. 10C

Example User Device Cache – User A

1110
| Course A Module 3 | Course A Module 4 | Course B – Module 1 |

FIG. 11A

Example User Device Cache – User B

1120
| Program A Episode 9 | Program A Episode 10 | Program A Episode 11 | Program A Episode 12 | Program A Episode 13 | Program A Episode 14 | |

FIG. 11B

Example User Device Cache – User C

1130
| Game 1 Level 16 | Game 1 Level 15 |

FIG. 11C

Example Network Connectivity Pattern

| Days | Time Range | Network Name | Type | Bandwidth | Data Limits | Overage Costs | Probability |
|---|---|---|---|---|---|---|---|
| M, T, W, R, F | 9:00pm – 5:30am | HOME_NET | IEEE 802.11n | 40 MHz | (none) | (none) | 98% |
| M, T, W, R, F | 5:30am – 7:15am | (cellular) | 4G LTE | 1.4 MHz | 3GB | $15/GB | 72% |
| M, T, W, R, F | 7:15am – 11:45am | WORK_NET | IEEE 802.11ac | 5 GHz | 10GB | (none) | 94% |
| ... | ... | ... | ... | ... | ... | ... | ... |
| Sat, Sun | 11:00pm – 8:30am | HOME_NET | IEEE 802.11n | 40 MHz | (none) | (none) | 81% |
| Sat, Sun | 8:30am – 10:30am | ------ | ------ | 0 MHz | ------ | ------ | 54% |

FIG. 14

Example Resource Usage Pattern

| Days | Time Range | CDN | Resource Type | Usage Time | Probability |
|---|---|---|---|---|---|
| M, T, W, R, F | 5:30am – 7:15am | Gaming CDN | Game ABC | 45 min | 60% |
| M, T, W, R, F | 5:30am – 7:15am | Gaming CDN | Game XYZ | 45 min | 33% |
| M, T, W, R, F | 5:30am – 7:15am | Media CDN | News Program | 27 min | 45% |
| M, T, W, R, F | 11:45pm – 1:00pm | Media CDN | Movie (Comedy) | 75 min | 28% |
| M, T, W, R, F | 11:45pm – 1:00pm | eLearning CDN | Course 1 – Interactive Mod. | 35 min | 38% |
| M, T, W, R, F | 3:00pm – 5:00pm | eLearning CDN | Course 1 – Video Lecture | 50 min | 75% |
| M, T, W, R, F | 3:00pm – 5:00pm | eLearning CDN | Course 2 – Text Book | 90 min | 52% |
| M, T, W, R, F | 3:00pm – 5:00pm | Gaming CDN | Game ABC | 45 min | 30% |
| ... | ... | ... | ... | ... | ... |

| | | User Devices | | | | | | |
|---|---|---|---|---|---|---|---|---|
| | | Smart Phone 1 | Laptop 1 | Tablet 1 | Tablet 2 | Smart Watch 1 | Vehicle Display 1 | ... |
| Content Output Capabilities | Plain Text | X | X | X | X | X | X | |
| | Rich Text | X | X | X | X | | X | |
| | HTML | X | X | X | X | | X | |
| | Audio | X | X | | X | X | X | |
| | High-Resolution Audio | | X | | X | | X | |
| | Video | X | X | X | X | | X | |
| | HD Video | | X | | X | | X | |
| | 3D Accelerated Graphics | | X | | X | | | |
| | ... | | | | | | | |
| Content Input Capabilities | Keyboard/Typing | | X | X | X | | | |
| | Touch Screen | X | | X | | | X | |
| | Voice Control | X | | | X | X | X | |
| | Mouse/Touch Pad Control | | X | X | | | | |
| | Camera | X | X | X | X | X | X | |
| | HD Camera | | X | | X | | | |
| | ... | | | | | | | |

| | | User Devices | | | | | |
|---|---|---|---|---|---|---|---|
| | | Smart Phone 1 | Tablet 1 | Tablet 2 | Smart Watch 1 | Vehicle Display 1 | ... |
| Gaming CDN | Game ABC | 6.0 | 8.5 | 9.0 | 4.0 | n/a | |
| Gaming CDN | Game XYZ | 9.0 | 7.5 | 7.5 | n/a | 3.5 | |
| Media CDN | Television Program 123 | 5.5 | 9.0 | 9.0 | 3.0 | 9.0 | |
| Media CDN | Audiobook DEF | 7.5 | n/a | n/a | 9.0 | 8.0 | |
| eLearning CDN | Prog. A: Video Lectures | 4.0 | 6.5 | 7.0 | 2.5 | 7.0 | |
| eLearning CDN | Prog. A: Reading Assignments | 5.5 | 9.5 | 9.5 | n/a | 1.5 | |
| eLearning CDN | Prog. A: Interactive Learning Lab | 3.0 | 7.5 | 7.0 | n/a | n/a | |
| eLearning CDN | Prog. B: Reading Assignments | 7.0 | 6.5 | 5.5 | 1.0 | 3.0 | |
| ... | ... | | | | | | |

FIG. 22

ADAPTIVE SYSTEM CACHE

BACKGROUND

Network performance is often critical when transmitting services, software, media, and other computing resources to user devices. In some cases, slow network performance may cause delays in the amount of time before computing resources can be received and executed on user devices. Furthermore, for content resources (e.g., software and services) that have a high degree of user interactivity, slow network speeds and other network performance issues can also negatively impact the user's experience during execution and consumption of the content resources. In many cases, these issues may be exacerbated on mobile devices where network connections may be slow, intermittent, unpredictable, and potentially subject to costly data charges.

Advanced caching of content resources is one possible solution to the challenges caused by network performance issues in delivering content to user devices. Media files, email inboxes, web sites, and other content resources may be downloaded locally onto a user device during a time of network connectivity, so that the cached content may be consumed at a later time after the device goes offline or otherwise loses connectivity. For instance, if an online user is viewing a streaming video via a website or software service, an advanced portion of the video may be streamed and cached so that user's viewing will not be interrupted if the user's device temporarily loses connectivity. However, the effectiveness of advanced caching of content resources may be limited by the available memory of the user device, and by the difficulties in predicting in advance what specific content the user will attempt to access when offline. Moreover, for certain types of content resources such as interactive and/or non-linear content resources, advanced resource caching may be difficult or even impossible due to the size and structure of the resources.

BRIEF SUMMARY

Various techniques (e.g., systems, methods, computer-program products tangibly embodied in a non-transitory machine-readable storage medium, etc.) are described herein for requesting and receiving adaptive content resources from content repositories, executing the adaptive content resources on user devices, and performing caching determinations and caching behaviors based on the execution of the adaptive content resources. In some embodiments, content resources may be executed on user devices in a content distribution network. User inputs may be received in connection with the execution of the content resources, and a user context may be determined based on user interactions and feedback during execution of the content resources. Additional content resources may be requested and received from content repositories, and then cached within user devices, based on the determined user context.

Additional techniques discussed herein relate to advanced identifying and caching of content resources in order to provide a seamless user experience for executing and/or consuming content resources, regardless of network connectivity status. According to some aspects, the caching of content resources, including both adaptive and non-adaptive resources, within user devices may be based patterns of network availability for the devices as well as patterns of resource usage on the devices.

According to additional aspects, caching determinations and caching behaviors may be coordinated among multiple different user devices associated with the same users and/or the same content distribution networks. In some cases, analyses of user context data, cache contents from multiple devices, content execution status and resource consumption patterns, and determinations of which content resources to be cached may be performed by individual user devices, or may be performed by content management servers. Additional techniques described herein relate to caching determinations and caching behaviors further based on the capabilities of the various user devices in the system. Further, in some embodiments, users may establish user-specific preferences for executing specific types of content resources on specific types of user devices.

BRIEF DESCRIPTION OF THE DRAWINGS

FIGS. 10A-10C are illustrative data tables containing lists of example content resources to cache on respective user devices, according to one or more embodiments of the disclosure.

FIGS. 11A-11C are illustrative memory system diagrams storing cached content resources, according to one or more embodiments of the disclosure.

FIG. 14 includes a table showing a set of sample data for an example network connectivity pattern associated with a user device, according to one or more embodiments of the disclosure.

FIG. 15 includes a table showing a set of sample data for an example resource usage pattern associated with a user device, according to one or more embodiments of the disclosure.

FIG. 21 is an illustrative table including example device-content compatibility data, according to one or more embodiments of the disclosure.

FIG. 22 is an illustrative table including example preference ratings for user devices with respect to content resource types, according to one or more embodiments of the disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
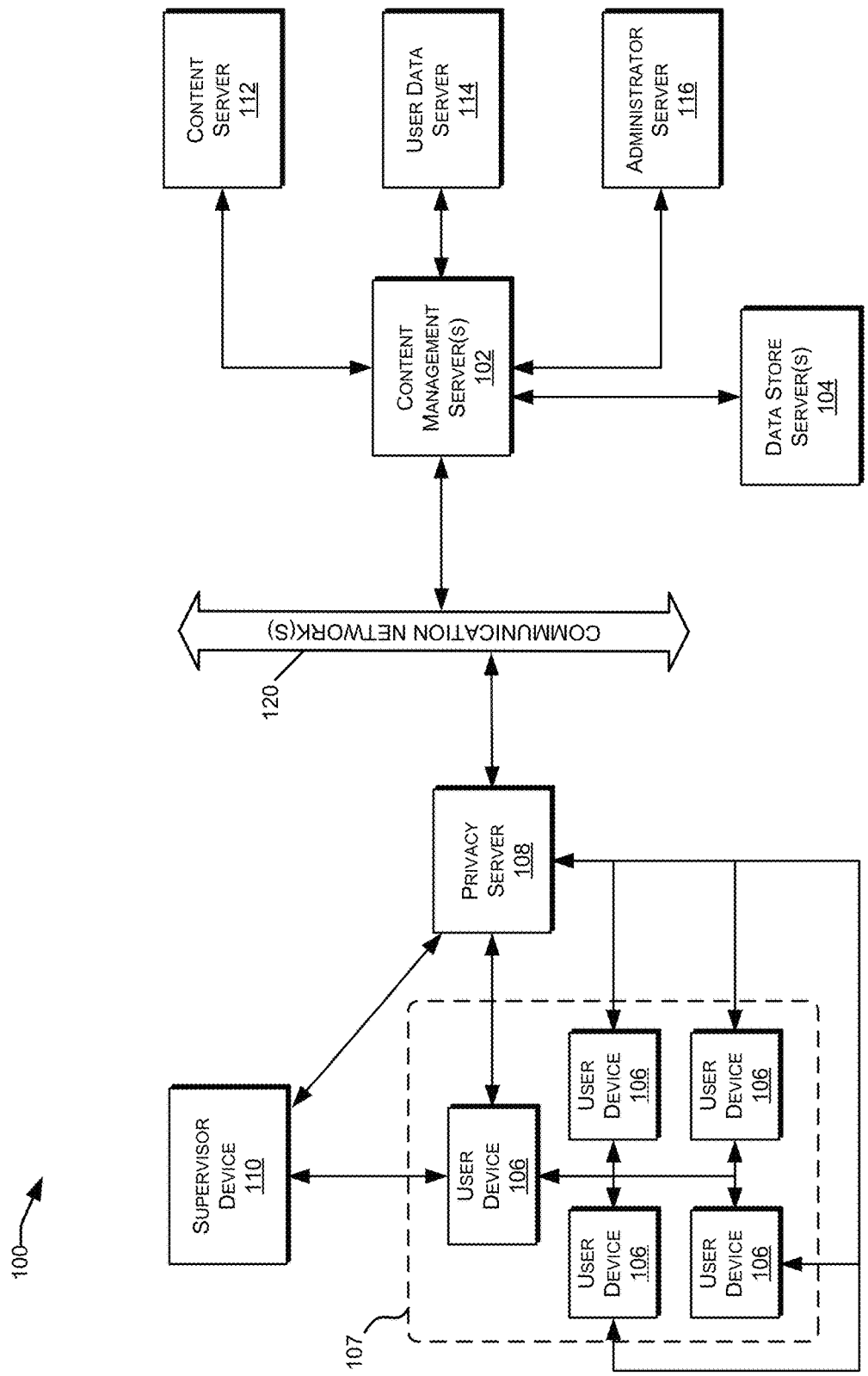
FIG. 1 is a block diagram showing illustrating an example of a content distribution network.

With reference now to FIG. 1, a block diagram is shown illustrating various components of a content distribution network (CDN) 100 which implements and supports certain embodiments and features described herein. Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as a thin-client computers, an Internet-enabled gaming systems, business or home appliances, and/or a personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include data stores of training materials, presentations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

Figure 2:
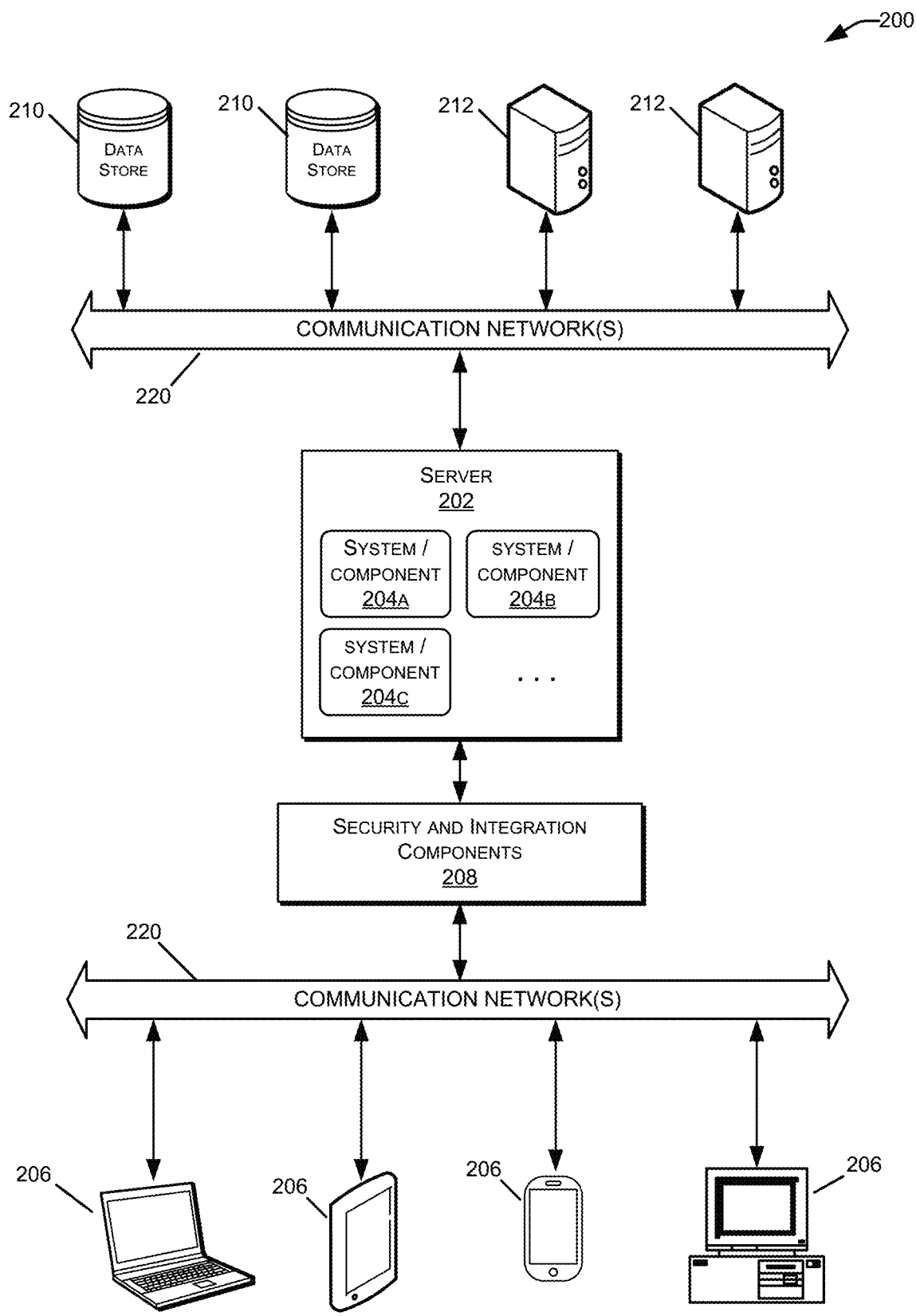
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as the Web Service Interoperability (WS-I) guidelines. For example, some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using the WS-Security standard, which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN).

Figure 3:
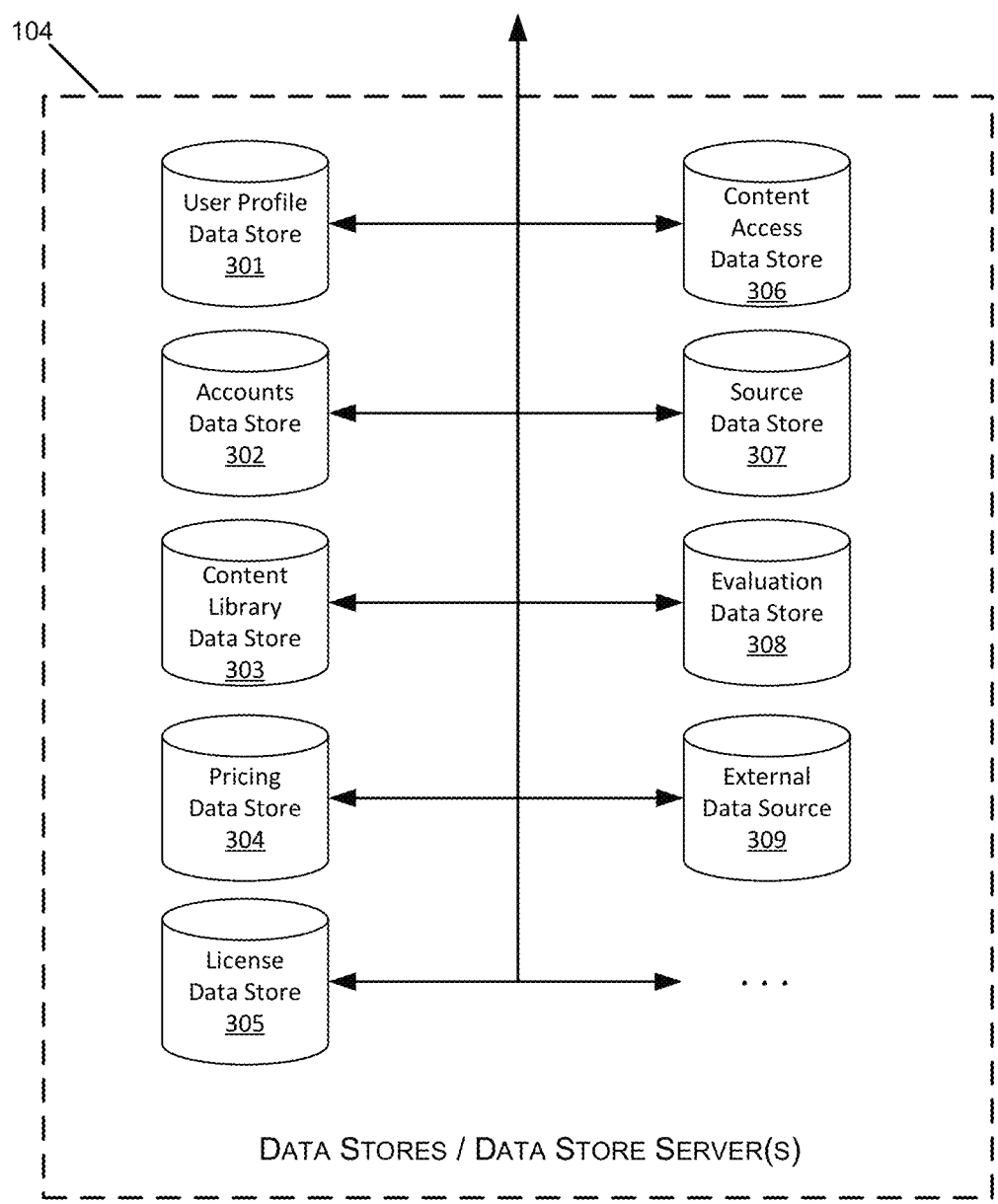
FIG. 3 is a block diagram illustrating an embodiment of one or more data store servers within a content distribution network.

With reference to FIG. 3, an illustrative set of data stores and/or data store servers is shown, corresponding to the data store servers 104 of the content distribution network 100 discussed above in FIG. 1. One or more individual data stores 301-309 may reside in storage on a single computer server 104 (or a single server farm or cluster) under the control of a single entity, or may reside on separate servers operated by different entities and/or at remote locations. In some embodiments, data stores 301-309 may be accessed by the content management server 102 and/or other devices and servers within the network 100 (e.g., user devices 106, supervisor devices 110, administrator servers 116, etc.). Access to one or more of the data stores 301-309 may be limited or denied based on the processes, user credentials, and/or devices attempting to interact with the data store.

The paragraphs below describe examples of specific data stores that may be implemented within some embodiments of a content distribution network 100. It should be understood that the below descriptions of data stores 301-309, including their functionality and types of data stored therein, are illustrative and non-limiting. Data stores server architecture, design, and the execution of specific data stores 301-309 may depend on the context, size, and functional requirements of a content distribution network 100. For example, in content distribution systems 100 used for professional training and educational purposes, separate databases or file-based storage systems may be implemented in data store server(s) 104 to store trainee and/or student data, trainer and/or professor data, training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber profiles, account data, payment data, network usage statistics, etc.

A user profile data store 301 may include information relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.).

An accounts data store 302 may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303 may include information describing the individual content items (or content resources) available via the content distribution network 100. In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources.

A pricing data store 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage and. In other cases, pricing may be tied to specific content resources. Certain content resources may have associated pricing information, whereas other pricing determinations may be based on the resources accessed, the profiles and/or accounts of the user, and the desired level of access (e.g., duration of access, network speed, etc.). Additionally, the pricing data store 304 may include information relating to compilation pricing for groups of content resources, such as group prices and/or price structures for groupings of resources.

A license data store 305 may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices, and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like.

In addition to the illustrative data stores described above, data store server(s) 104 (e.g., database servers, file-based storage servers, etc.) may include one or more external data aggregators 309. External data aggregators 309 may include third-party data sources accessible to the content management network 100, but not maintained by the content management network 100. External data aggregators 309 may include any electronic information source relating to the users, content resources, or applications of the content distribution network 100. For example, external data aggregators 309 may be third-party data stores containing demographic data, education related data, consumer sales data, health related data, and the like. Illustrative external data aggregators 309 may include, for example, social networking web servers, public records data stores, learning management systems, educational institution servers, business servers, consumer sales data stores, medical record data stores, etc. Data retrieved from various external data aggregators 309 may be used to verify and update user account information, suggest user content, and perform user and content evaluations.

Figure 4:
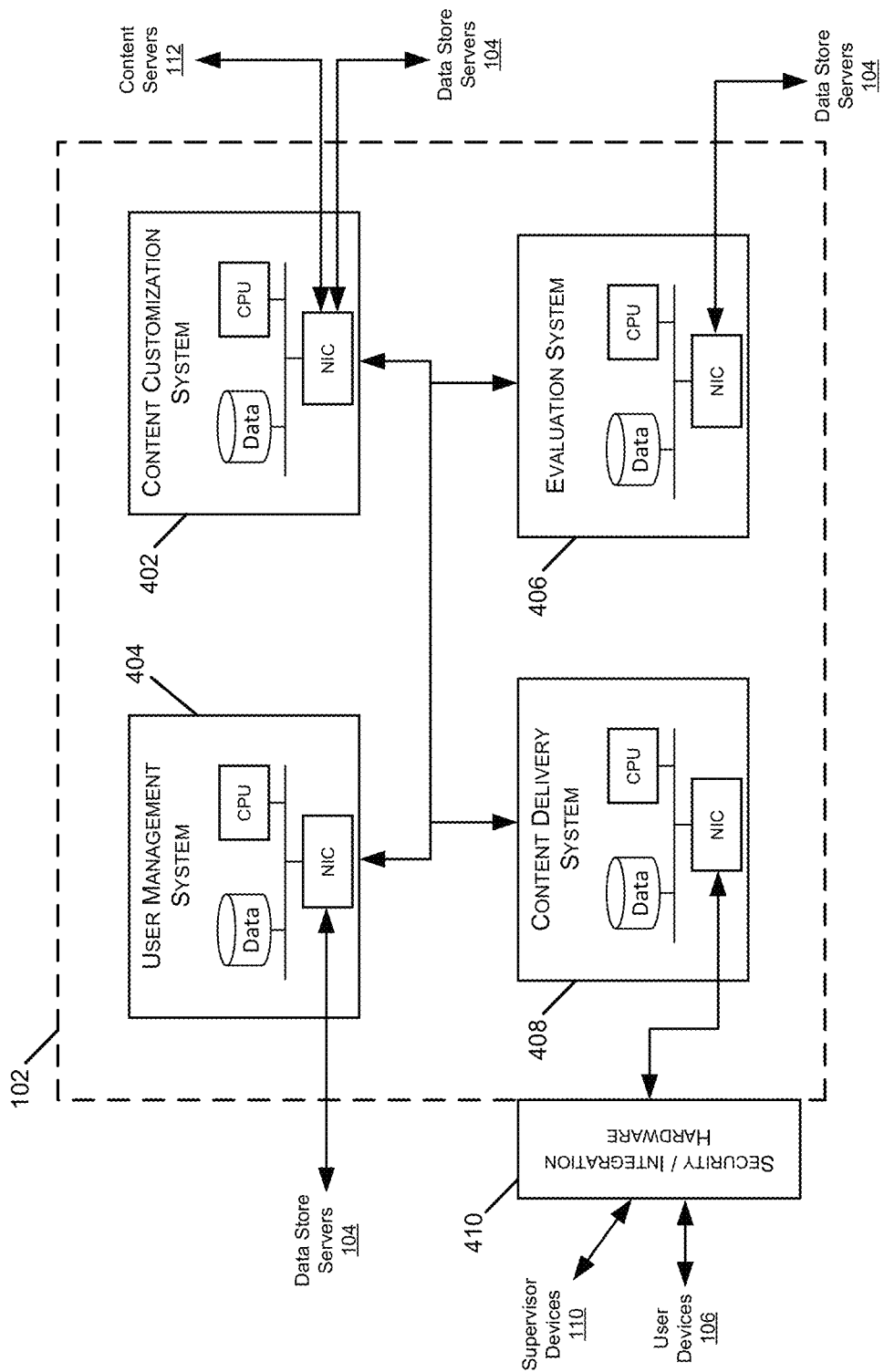
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. As discussed above, content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a content customization system 402. The content customization system 402 may be implemented using dedicated hardware within the content distribution network 100 (e.g., a content customization server 402), or using designated hardware and software resources within a shared content management server 102. In some embodiments, the content customization system 402 may adjust the selection and adaptive capabilities of content resources to match the needs and desires of the users receiving the content. For example, the content customization system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the content customization system 402 may modify content resources and/or may modify content sequencing for individual users.

A content management server 102 also may include a user management system 404. The user management system 404 may be implemented using dedicated hardware within the content distribution network 100 (e.g., a user management server 404), or using designated hardware and software resources within a shared content management server 102. In some embodiments, the user management system 404 may monitor the progress of users through various types of content resources and groups, such as media compilations, courses or curriculums in training or educational contexts, interactive gaming environments, and the like. For example, the user management system 404 may query one or more databases and/or data store servers 104 to retrieve user data such as associated content compilations or programs, content completion status, user goals, results, and the like.

A content management server 102 also may include an evaluation system 406. The evaluation system 406 may be implemented using dedicated hardware within the content distribution network 100 (e.g., an evaluation server 406), or using designated hardware and software resources within a shared content management server 102. The evaluation system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the network 100. The evaluation system 406 also may receive and analyze user evaluation data from user devices 106, supervisor devices 110, and administrator servers 116, etc. For instance, evaluation system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

A content management server 102 also may include a content delivery system 408. The content delivery system 408 may be implemented using dedicated hardware within the content distribution network 100 (e.g., a content delivery server 408), or using designated hardware and software resources within a shared content management server 102. The content delivery system 408 may receive content resources from the content customization system 402 and/or from the user management system 404, and provide the resources to user devices 106. The content delivery system 408 may determine the appropriate presentation format for the content resources based on the user characteristics and preferences, and/or the device capabilities of user devices 106. If needed, the content delivery system 408 may convert the content resources to the appropriate presentation format and/or compress the content before transmission. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
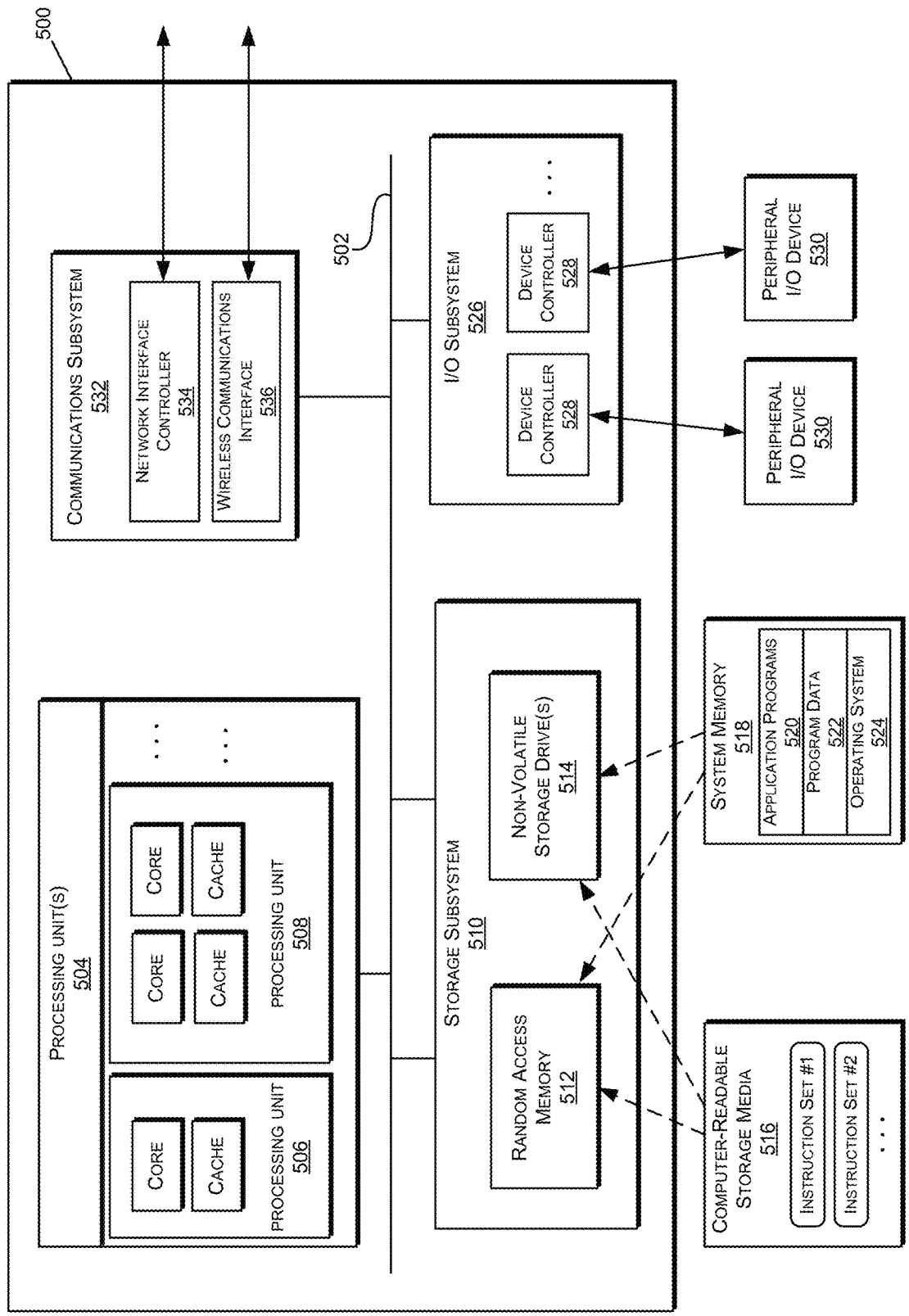
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 518 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a Fire-Wire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 309). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
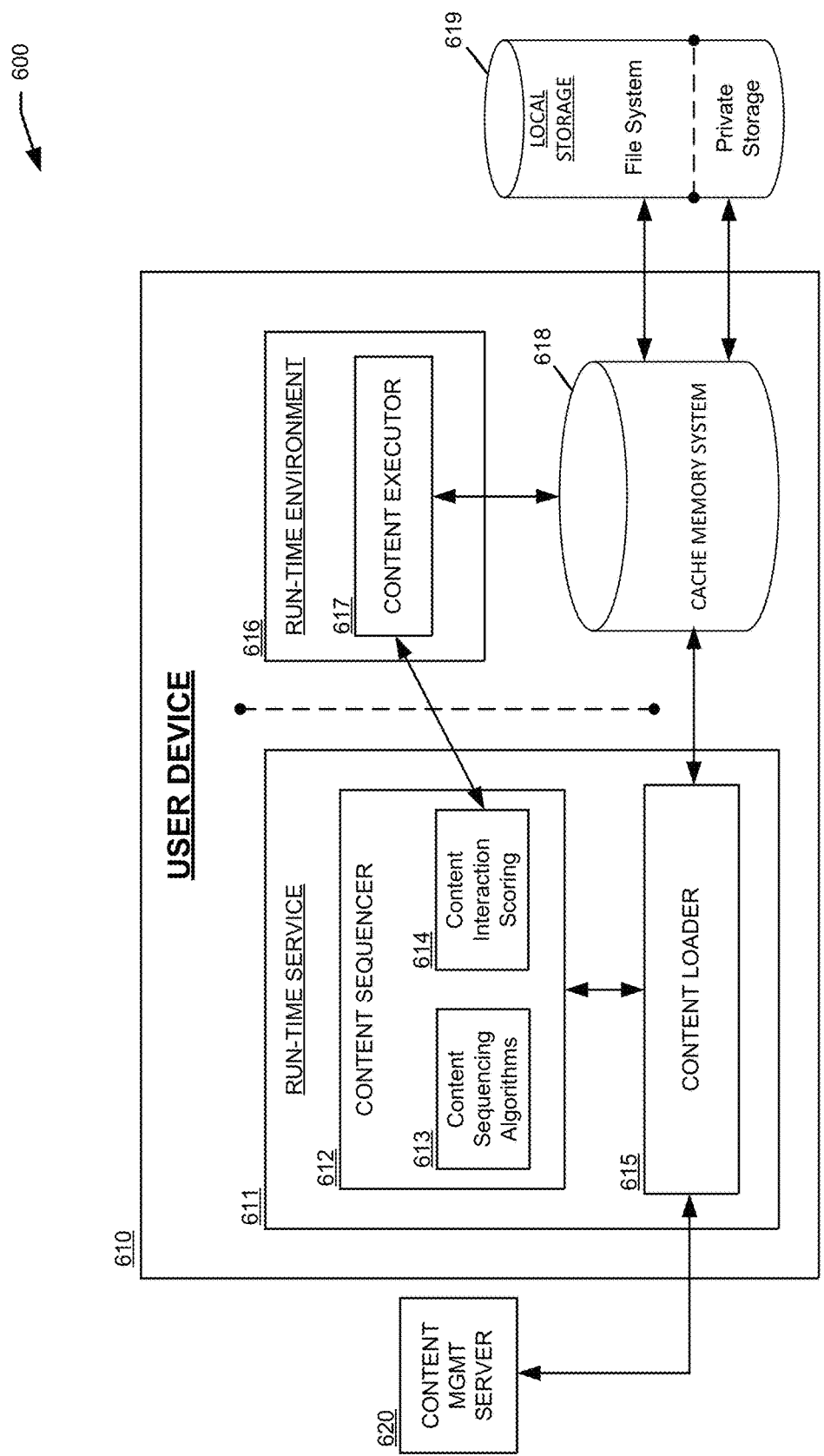
FIG. 6 is a block diagram illustrating an example of an adaptive cache system, according to one or more embodiments of the disclosure.

With reference now to FIG. 6, a block diagram is shown illustrating an example adaptive cache system 600, including a user device 610 and a content management server 620. In some embodiments, adaptive cache systems such as system 600 illustrated in this example may be integrated within (or configured to operate in collaboration with) one or more content distribution networks 100. For example, an adaptive cache system 600 may be the same as, or may operate within or in collaboration with, any of the content distribution network (CDNs) 100 described above. Thus, specific examples of adaptive cache systems 600 (and/or CDN 100), may include, without limitation, educational and professional training systems and networks, interactive gaming systems and networks, media distribution systems and networks, and enterprise application systems and networks, websites and other Internet-based systems and networks. In such cases, content servers 620 may correspond to one or more content servers 112, content management servers 102, and/or data store servers 104, and the user device 610 may correspond to the user devices 106 and 110 described above in reference to CDN 100. Within the adaptive cache system 600 (and/or CDN 100), user devices 610 may request and receive content resources from content management servers 620, execute the content resources using the hardware and software components of the user devices 610, and then transmit various user interaction data back to the content management servers 620. In order to perform such features, each of the components and sub-components discussed in the example adaptive cache system 600 may correspond to a single computer server or a complex computing system including a combination of computing devices, storage devices, network components, etc. Each of these components and their respective subcomponents may be implemented in hardware, software, or a combination thereof. Further, certain components within adaptive cache system 600 may include special purpose hardware devices and/or special purpose software, such as those included in the run-time service 611, content sequencer 612, content loader 615, run-time environment 616, cache memory system 618, and storage 619, discussed below.

Additionally, although this example shows a number of these components residing within a user device 610, it should be understood that the various specialized components described below need not reside on the user device 610, but may be deployed elsewhere within the network. For instance, in some cases, only the run-time environment 616 and content executor 617 may reside on the user device, and the other components shown in FIG. 6 (e.g., the run-time service 611, content sequencer 612, content loader 615, cache memory system 618, storage 619, etc.) may be distributed on the network depending on performance of the network and the circumstances and/or requirements of the deployment. The implementation shown in FIG. 6, in which these components are shown on a user device 610, may be advantageous in some cases, such as where off-line completely detached operations are required. However, a number of other different scenarios may be supported by different distribution configurations.

As discussed in detail below, adaptive cache system 600 and other embodiments described herein may be used to execute content resources on user devices 610, receive user inputs via user devices 610 during the execution of content resources, determine user contexts, and request and retrieve content resources from content management servers 620 for caching onto user devices 610. Content resources may refer to any digital content, such as media content (e.g., music, movies, television programming, audiobooks, advertisements, etc.), gaming software, professional training and eLearning resources (e.g., courses, texts, lectures, interactive modules, tests and evaluations, etc.), as well as websites and other web-based content. Various content resources may be transmitted from content management servers 620, and then stored and executed on user devices 610 as files, executable software, services, and the like. Users may consume (e.g., view, read, listen to, play, etc.) content resources via on compatible user devices 610 using the set of required hardware and software resources on the user device 610. In some embodiments, the content resources requested, cached, and executed may be adaptive content resources. As used herein, adaptive content resources may refer to resources that are presented differently based on user behaviors. For example, certain adaptive content resources may include interactive and/or non-linear resources, such as games or training/eLearning modules, which may be selectively presented in a specific order, speed, etc. based on the interactions of the user consuming the content. In other examples, adaptive content resources may include resources which may be dynamically modified and/or customized based on user behaviors and patterns.

User device 610 may include a desktop or laptop computer, various types of mobile devices, and other various computing devices/systems, including some or all of the hardware, software, and networking components discussed above. Specifically, user device 610 may be any computing device with sufficient memory for storing one or more content resources, and the processing and I/O subcomponents for executing the content resources. In some embodiments, content resources such as television programming, music, movies, lectures or materials in a training course or eLearning system, and/or gaming content may be transmitted from one or more content providers (e.g., content management server 620) to the user devices 610. The user device 610 thus may include the necessary hardware and software components to establish the network interfaces, security and authentication capabilities, and content caching capabilities to receive the content, store the content, and execute the content to provide to users in real-time or at later time.

Certain embodiments described herein may relate to user devices 610 having intermittent network connectivity, and thus user devices 610 may be described as various types of mobile devices. Laptop computers, tablet computers, smart phones, smart watches, wearable computing devices, and vehicle-based computing systems are examples of mobile user devices 610 that may have intermittent connectivity and may be configured to interface with different communication networks at different times and/or in different physical locations.

In this example, user device 610 includes a run-time service (RTS) 611, a run-time environment (RTE) 616, a cache memory system 618, local storage 619. The RTS 611 and RTE 616 may be implemented as independent and physically deployable containers. In some embodiments, the RTS 611 and RTE 616 may be married into a single logical construct that may be configured and deployed as a unit onto a runtime context.

The run-time service (RTS) 611 in this example includes a content sequencer 612 and a content loader 615. The content sequencer 612 may be configured to generate and manage plans for accessing content resources, request the content resources to implement the plans, and also score user interactions with the content resources. Thus, the content sequencer 612 may include a set of content sequencing algorithms 613 which may be invoked to determine a set of content resources for caching, and a content interaction scoring module 614 to measure and score user interactions with the content resources executed within the RTE 616. As discussed below in more detail, the content sequencer 612 may use the interactions and feedback received from users while consuming content resources via the RTE 616 to determine a user context including resource consumption status, user patterns, user behaviors, and the like. The user context may be used by the content sequencer 612 along with the content sequencing algorithms 613 to determine additional content resources to request and cache on the user device 610.

The content loader 615 may be configured to physically interact with one or more remote content repositories, such as content management system 620, including requesting, receiving and staging content resources from the remote repositories. The content loader 615 also may include a set of interfaces that may be used by content sequencer 612 to perform functionality of the content sequencer 612 described above. Specifically, the content loader 615 may be configured to provide delivery of packages of assets (or content resources) from remote repositories, to perform local asset package caching, to extract content to local storage 619 from asset packages, and to provide application programming interfaces (APIs) to be used by the content sequencer 612 to perform various content usage functionality. The content loader 615 also may maintain an awareness of the content asset packaging, as well as any existing (or potential) dependencies between requested content resources. Additionally, the content loader 615 may implement one or more physical transport mechanisms that may be needed to reference the desired content resources based on content staging and deployment metadata.

The run-time environment (RTE) 616 may be implemented as a container object embodying the functionality to execute content resources and receive user interactions and feedback. Thus, the RTE 616 may include the physical hardware, drivers, loaders, and the like, to load and execute the requested content resources. Various different types and media of content resources may be supported by RTEs 616 in different embodiments. For instance, RTE 616 may include a content executor 617 with components to load, render, and play still images, animation, video, and/or audio content resources. The RTE 616 also may include components to implement rules for logical presentation of content resources. For example, individually or in collaboration with the content sequencer 612, the RTE 616 may perform ordering of non-linear and/or interactive content resources, user-selection modalities, presentation of feedback to users, as well as capturing click-stream data, user data, and/or any relevant data related to user feedback and interaction with the content. As discussed above, the RTE 616 may transmit the click-stream data and other relevant data to the RTS 611 to be used for scoring user interactions and determining content plans and content resources for caching. Additionally, in some embodiments, the RTE 616 may be configured to detect any computing errors occurring during the retrieval, loading, or execution of content resources, and to report such errors to the user and to the RTS 611 so that any content plans and determinations of content resources for caching may be adjusted accordingly.

In various different embodiments, different combinations of hardware, software, and networking components and technologies may be used to implement the adaptive cache system 600. For example, the adaptive cache system 600 may be designed and implemented to deliver MACROMEDIA FLASH-based content resources to users by packaging Sharable Content Object (SCO) content resources (e.g., Learning Objects or LOs) and one or more FLASH players into content resource packages (or asset packages). In such embodiments, the RTS 611 may be implemented as a JAVA applet executing within a web page (e.g., using JAVA plug-in installed in the browser), and the content loader 615 may be implemented as a JAVA class loader, APACHE MAVEN software tool, or the like. The RTE 616 may be implemented as a FLASH projector and/or other content execution component.

Such asset packages may be formatted and transmitted from a content repository 620 to the user device as JAVA ARCHIVE (JAR) files containing the multiple bundled files. For example, the RTS JAVA applet 611 may transmit an HTTP request via the JAVA class loader 615, over an IP-based network to a web server 620, which may respond with one or more JAR packages. In some embodiments, the web server 620 (and/or other content resource repositories) may support real-time delivery via HTTP, streaming, WEBSOCKET protocol, FABRIC.JS, AMAZON S3, and the like. Each JAR package may include, for example, a manifest file that describes the metadata of the included content resource(s) as well as the deployment structures for the packaged content resources. The JAR files may be utilized by the RTS applet 611 and associated JAVA class loader 615, which may leverage the HTTP protocol to deliver the content resources into a local JAVA cache (e.g., within cache memory system 618). The RTS applet 611 may then access content JARs from the JAVA cache 618 (e.g., directly or via JAVA class loaders 615) to extract and stage encapsulated content in accordance with the content sequencing plans determined by the RTS applet 611 using the content sequencing algorithms 613 and content interaction scoring modules 614.

In such examples, a FLASH-based player (e.g., content executor 617) used to execute the content resources may be packaged for multiple user devices (e.g., WINDOWS-based devices 610, MAC-based devices 610, ANDROID-based devices 610, etc.). For certain devices, (e.g., iOS devices) Javascript and/or native code may be used instead of Java and FLASH. The RTS applet 611 may determine which implementation of the content executor 617 to launch based on platform-specific metadata received from the JAVA virtual machine along with configuration information describing the capabilities of each content executor 617 and information describing how the deployed content resources should be executed and managed within the RTE 616. In some embodiments, cache memory system 618 may be implemented as physical or logical memory partitions, for example, a local user memory partition and a persistent memory partition. In such cases, the local user memory partition within the cache memory system 618 may include user memory, local media application packages, JAVA user file storage, MAVEN repositories, and the like. A separate logical or physical partition may include, for example, a persistent JAVA virtual machine system cache, application store, virtual machine service, BROWSER SANDBOX, remote MAVEN repositories, and the like. Local media 619 may correspond to a file system server, digital optical disc, Universal Serial Bus (USB) drive, mounted Storage Area Network (SAN), or other storage system configured to store content resources that may or may not be currently stored within the cache memory system 618. As shown, local media 619 also may include one or more physical or logical partitions. Although the example adaptive cache system 600 shows two local storage systems 618 and 619, it should be understood that different numbers of storage systems may be used in different embodiments (e.g., 1, 3, 4, etc.). Further, both the cache storage system 618 and local storage 619 may be considered cache memory systems on the user device 610, since both memory systems may store content resources in local memory devices that can be accessed on the user device 610 during periods of limited or no network connectivity. Thus, the memory structure, and the computing system architecture as a whole, shown in the example adaptive cache system 600 should be considered illustrative only and non-limiting.

Figure 7:
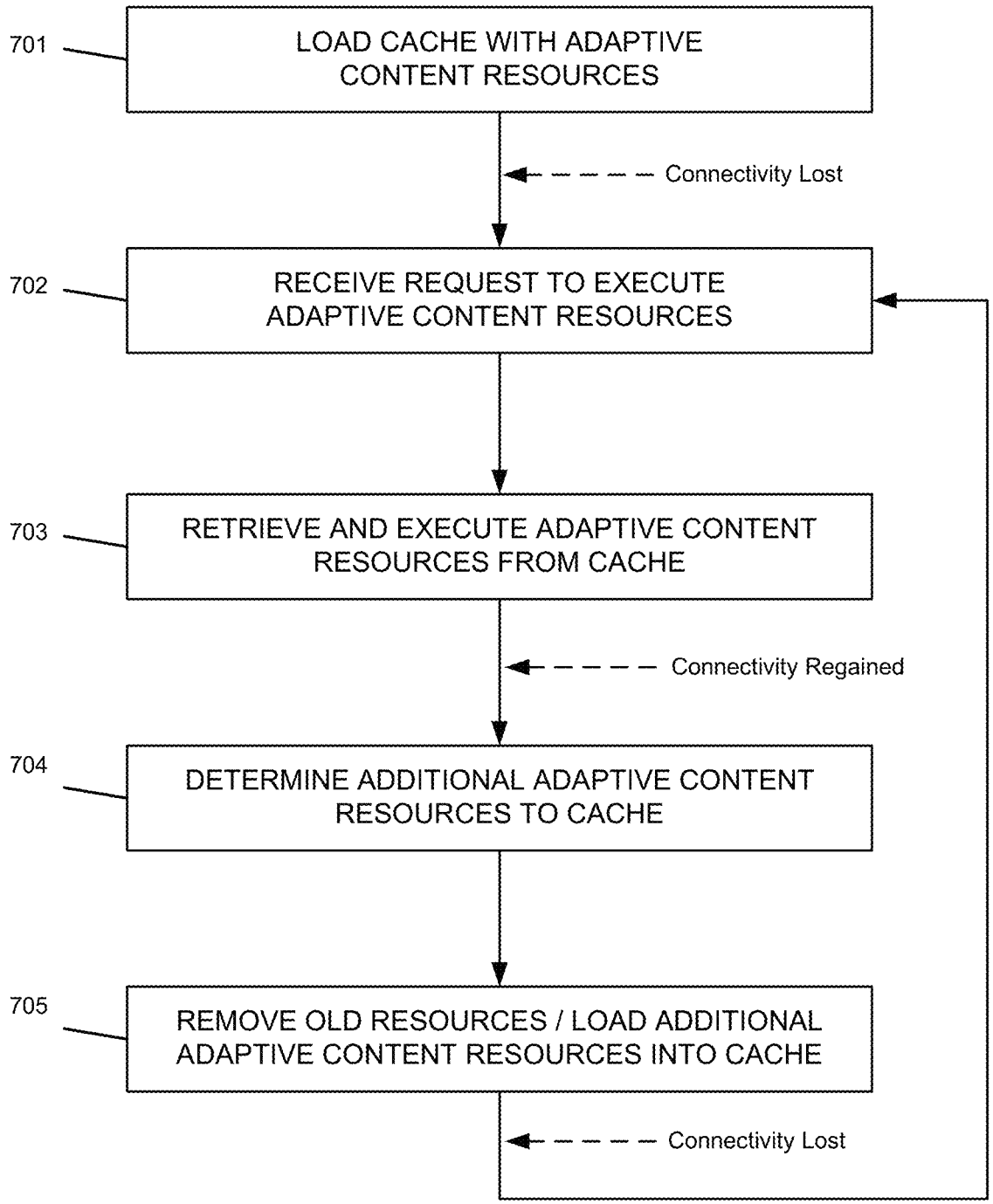
FIG. 7 is a flow diagram illustrating an example process of caching adaptive content resources on a user device, according to one or more embodiments of the disclosure.

Referring now to FIG. 7, a flow diagram is shown illustrating a process of caching adaptive content resources onto user devices. As described below, the steps in this process may be performed by one or more components in the example user device 610 described above, such as the content sequencer 612, content loader 615, and/or content executor 617. However, it should be understood that the processes of retrieving, loading, and executing adaptive content resources onto computing devices need not be limited to the specific systems and hardware implementations described above in FIGS. 1-6, but may be performed within other computing environments comprising other combinations of the hardware and software components, such as client-server systems, cloud-based systems, CDNs having centralized caches and/or multi-tier caches for caching adaptive content, and the like.

In step 701, the example process may begin by initially loading one or more adaptive content resources into a cache memory system of a user device. As discussed above, adaptive content resources may refer to any content resources that may be presented differently based on user behaviors. For example, some adaptive content resources may be non-linear and interactive resources that may be presented in multiple different orders depending on user interactions during the playback or execution of the resources. Interactive books, interactive adventure games, interactive movies, and the like (also referred to as "choose your own adventure" content resources) may be examples of non-linear and interactive resources. Other examples of adaptive content resources may include resources that may be executed (e.g., played) with different audio or visual features based on the capabilities (or disabilities) of different users or user devices. For example, certain adaptive content resource may include optional closed-captioning or subtitles for hearing-impaired users, or additional visual display settings (e.g., larger print, higher resolution with zoom capabilities, etc.) for vision-impaired users.

Still other examples of adaptive content resources may include groups of related resources of different types and/or different media, such as professional training or eLearning modules, games, or other interactive software packages. For instance, professional training or eLearning module or class may include one or more text-based resources (e.g., eBooks or text files with note taking features), one or more video-based resources (e.g., video lectures, etc.), and one or more interactive software components (e.g., self-paced interactive assignments, tests and evaluations, etc.). Similarly, games and other software packages may include multiple different modules/levels, along with related text-based and video-based resources (e.g., instructions, video tutorials, FAQs, and other documentation). The different content resources in such groups often are not (or cannot be) executed simultaneously by users, and although these groups may be closely related and potentially designed to be executed in a specific order, they may be executed different numbers of times, and in different orders, by different users. In this way a group of related content resources, even when the individual resources are linear and non-interactive by themselves, may be treated collectively like a single interactive and non-linear resource because users may execute different resources of the group at in different orders, at different velocities, at different remediation rates, etc.

As noted above, user devices 610 and other components of adaptive cache systems 600 may be implemented within various different types of content distribution networks. Such CDNs and/or adaptive cache systems 600 may include, without limitation, educational and professional training systems and networks, interactive gaming systems and networks, media distribution systems and networks, and enterprise application systems and networks, websites and other Internet-based systems and networks. Accordingly, different types of adaptive content resources may be loaded and execute within these different types of CDNs and/or adaptive cache systems 600. For example, in CDNs 100 (e.g., adaptive cache system 600) used for professional training and educational purposes, the adaptive content resources loaded in step 701 may include interactive and non-linear learning modules, course materials, and the like, as discussed above. For CDNs 100 or 600 used for gaming and other software programs, media distribution, and the like, the adaptive content resources loaded in step 701 may include interactive and non-linear games, electronic books, television programming, movies, software packages, and the like.

As discussed below, loading adaptive content resources onto the user device in step 701 may be performed in anticipation of the user device losing some or all connectivity with one or more networks of a CDN 100 or 600. By storing locally (or caching) the adaptive content resources, these resources may be available for users to play/execute even after the user device has lost network connectivity. Accordingly, the user device 610 may include various types of mobile device in some embodiments, such as laptop computers, tablet computers, smart phones, smart watches, wearable computing devices, and vehicle-based computing systems, and other such devices that may have intermittent network connectivity.

In some embodiments, in step 701 a user device in a CDN may receive and load the adaptive content resources into one or more cache memory systems. The process and the technical features involved in loading content resources into one or more cache memory systems of a user device 610 are discussed in more detail below in reference to FIG. 8. As used herein, a cache memory system may refer to any storage still accessible to the user device after losing connectivity with one or more networks of a CDN 100 or 600. For example, in step 701 user device 610 may load adaptive content resources into the cache memory system 618 or into local storage 619. Additionally, external storage drives, flash memory drives, and other detachable storage devices may be used as cache memory systems in some embodiments, as the data stored on such storage devices may be available after losing connectivity with one or more networks.

In step 702, a request is received by the user device 610 to execute one or more of the adaptive content resources loaded onto the device in step 701. Thus, the request received in step 702 may be a request by a user to execute (or play) an interactive and non-linear content resource (e.g., an interactive book, program, or movie), an interactive game, interactive software, or a professional training/eLearning class or module, etc.

As shown in the figure, the request to execute adaptive content resources in step 702 may be received after the user device 610 has lost network connectivity. As discussed below, a period of lost network connectivity may indicate that no network is available for connection by the user device 610, or that the user device 610 has low network signal strength or is otherwise unavailable to establish a high-quality network connection to an available network. In other examples, the only network(s) available may be undesirable networks for the user device 610 to connect to (e.g., networks having bandwidth restrictions, data caps, network usage charges, web site restrictions or other access restrictions, etc.).

In step 703, the adaptive content resources may be retrieved from the cache memory system(s) (e.g., 618 and/or 619) and executed on the user device 610. As discussed above, in some embodiments, a run-time environment (RTE) 616 of the user device 610 may retrieve and execute various types of adaptive content resources. During the retrieval and execution of adaptive content resource in step 703, one or more content executors 617 may be used to load, render, and play still images, text, animation, graphics, video, and/or audio content resources, etc. Additionally, RTEs 616 may implement the rules for logical presentation of adaptive content resources (e.g., content order based on response to user navigation and flow, user or device based presentation speed, module selection, and other user- and content-related presentation determinations).

During and after the execution of adaptive content resources, the user device 610 also may receive click-stream data, user feedback, content navigation decisions, and the like from users via input devices (e.g., keyboard, mouse, touchscreen, voice controls, motion and gesture determinations, etc.). As described below in more detail, this data may be used for scoring user interactions determining content plans, and selecting additional content resources for caching and loading. For example, user interactions and feedback received from users during execution of adaptive content resources may be provided to the content sequencer 612, which may analyze the user interactions and feedback to determine user context data such as resource consumption status, resource selection and usage patterns, user behaviors and preferences, and the like.

Although steps 902-903 may be performed when the user device 610 has limited or no network connectivity, as shown in this example, requests also may be received and adaptive content resources also may be executed when the user device 610 has full network connectivity. In such cases, adaptive content resources similarly may be loaded from the cache memory systems and executed on the user device 610, and user interactions and feedback similarly may be collected and analyzed during execution of the resources. However, because full network connectivity may be available in these examples, the determinations of user context data and selection/request/loading of additional resources may be performed in real-time or near real-time. Additionally, specific examples of processes and the technical features involved in receiving requests for resources (step 702) and retrieving and executing resources on a user device 610 (step 703) are discussed in more detail below in reference to FIG. 9.

In step 704, the user context data collected and determined in connection with the execution of the adaptive content resources in step 703 may be used to select additional adaptive content resources for caching on the user device 610. As noted above, the user context data may include the adaptive content resources that were executed, the user's current location (e.g., playback location, game/module level, current points or rating, etc.) within the resources, amount of time the user played/executed the resources, a record of the user decisions and other interactions during the execution of the resources, express user feedback (e.g., ratings, discussion posts, etc.) relating to the resources, audio and/or visual cues (e.g., voice feedback, gestures, etc.) and the like. Various components within the user device 610 may collect and store the user context data, after which the data may be analyzed and used to determine content plans and/or select specific adaptive content resources for the user. As used herein, content plans may include predetermined related groups of adaptive and/or non-adaptive content resources, such as interactive games or other media containing multiple levels, modules, or other content resources, professional training or eLearning modules, classes, or curriculums etc. Content plans may be generated or selected for specific users, or may apply to groups of users with common characteristics and user context data.

Determining content plans for users and/or specific sets of additional content resources to request, retrieve, and load in step 704 may be based on various different factors and determinations based on the user context data collected in step 703. Initially, the current status of the user in consuming/executing the adaptive content resources in step 703 may be determined and used in step 704. For example, after the user regains connectivity with one or more networks, the user device 610 may determine and store which previously loaded resources the user has accessed and/or completed. For any resources that the user has partially consumed/executed, the user device 610 may determine and store data describing the user's current execution point within the resources, such as the user's current playback location, decision tree branch, and/or user interface screen. Such data also may include the user's current score, notes, answers, and the like (e.g., for specific game levels or eLearning modules, etc.), within the user's current execution of the adaptive content resources. For previously completed content resources and/or in-progress adaptive, the information collected may include the amount of time, the number of attempts, etc. that the user has spent at various different points (e.g., levels, decision points, user interface screens, modules, etc.) within the consumption/execution of the content resources.

Additionally, the velocity and/or the remediation rate of a user during execution of adaptive content resources may be determined and used in step 704. Velocity may refer to the speed at which a user consumes adaptive content resources, and remediation rate may refer to the rate at which a user returns to previously consumed/executed content while consuming adaptive content resources. To illustrate, a first user who quickly consumes and finishes interactive media, game level, eLearning modules, and the like, may be assigned a high velocity for consuming adaptive content resources, whereas a second user who proceeds slowly through such adaptive content resources (circling back, selecting all choices, repeating levels/modules, etc.) may be assigned a low velocity. However, if the first user (or another user) returns frequently to previously views/executed resources, then the first user may be assigned a high remediation rate, where if the second user (or another user) rarely returns to a resource after completing it, then the second user may be assigned a low remediation rate. User velocities and/or remediation rates may be calculated based on times to complete resources, numbers of user decisions/interactions, and/or numbers or rates of resource consumption, etc.

The determinations in step 704 also may be based on analyses of user resource consumption paths. User resource consumption paths, although related to velocity and remediation rates, may refer to different analyses including a user's consumption patterns and preferences for consuming/execution multiple resources. For example, in a CDN 600 providing media content resources (e.g., games, television programming, movies, etc.) a first user may establish a pattern of consuming all resources in a single group or type (e.g., all levels of a single game, all episodes of single television series, etc.), before moving onto the next group. In contrast, another user may establish a pattern of jumping around between groups or types when consuming resources (e.g., finishing a single level/module/episode and then moving on to play a different game/television series/eBook/music selection, etc.). As another example, in a CDN 600 providing professional training and eLearning content resources to users, a first user may establish a pattern of executing a video lecture for a training/learning module before reading the accompanying texts and completing the interactive portion of the module, while a second user may establish an opposite pattern. Additionally, one user may establish a pattern of consuming all of the nightly/weekly assigned resources for a one class before moving onto another class, while a different user may establish a pattern of working on the assigned resources for one class for a specified time period (e.g., 30 mins, 1 hour, etc.) and then switching to another class.

Some or all of the user context data described above, such as the user's current status in consuming/executing the content resources, the user's consumption velocity, remediation rate, and consumption path pattern, etc., may be collected, stored, and provided to the content sequencer 612 to determine a content plan and/or additional content resources for the user. For example, one or more of the user's current status, velocity, remediation rate, and consumption path patterns may be quantified as content interaction scores 614 and then provided as input to one or more content sequencing algorithms 613. Additional inputs to such algorithms may include the user's demographics, previous history of resources consumed/executed, and other user characteristics. For example, for professional training and/or eLearning CDNs 600, the determination in step 704 also may be based on the user's current classes/curriculums, the user's studying and system usage patterns, etc. For interactive media and gaming CDNs 600, the determination in step 704 also may be based on the user's recent media/game purchases or subscriptions, playing/viewing patterns, etc.

The output content sequencing algorithms 613, which also may correspond to the determinations in step 704, may be one or more content resources that the user is likely to request for consumption/execution in the near future. As discussed above, adaptive cache systems 600 and related techniques may be used to provide a seamless user experience for consuming content resources, regardless of the user's network connectivity status. Accordingly, in some embodiments, the determination in step 704 may be used to select content resources having a highest likelihood of subsequent selection by the user.

Referring now to FIGS. 10A-10C, three example data tables are shown representing a plurality of content resources that may be selected for caching in step 704 for three different users and/or user devices 610. For example, within the adaptive cache system (and/or CDN) 600, example tables 1010, 1020, and 1030 may illustrate certain data generated and stored by the content sequencer 612. As shown in these figures, tables 1010, 1020, and 1030 represent three different lists of content resources to be cached for three different users (and/or on three different user devices 610). Table 1010 in FIG. 10A shows a set of content resources to be cached for a user ("User A") within a professional training or eLearning CDN 600, table 1020 in FIG. 10B shows a set of content resources to be cached for a different user ("User B") within a media distribution CDN 600 (e.g., providing television programming, movies, music, and the like, to users), and table 1030 in FIG. 10C shows a set of content resources to be cached for a different user ("User C") within a gaming CDN 600 (e.g., providing interactive and/or online games to users).

Tables 1010-1030 in FIGS. 10A-10C each include content resource identifiers and names for a list of content resources to be cached on a respective user device 610. Additionally, tables 1010-1030 include resource size data, the calculated probability that the user will request the content resource, and the anticipated amount of time for the user to complete the execution of the content resource. This data may be among the data determined by and stored by the content sequencer 612 and/or other components of the user device 610 in step 704. For example, the usage probabilities in tables 1010-1030 may be calculated in step 704 based on the received user context data, such as the user's execution status of other resources, the user's consumption velocity, the user's remediation rate, and the user's consumption path patterns and preferences. Additionally, the estimated resource completion times in tables 1010-1030 may be calculated in step 704 based on the user's velocity. Both the usage probabilities and the estimated completion times also may be calculated based on one or more other factors, such as the resource-specific, user-specific, and device-specific characteristics discussed below.

The lists of content resources in tables 1010-1030 have been sorted by usage probabilities in these examples. In some embodiments, the usage probabilities may be a primary (or only) factor for determining in step 704 which resources should be cached on the user device 610. In other cases, resource size, estimated completion time, available cache size, and other factors also may be considered when determining which resources to be cached on the user device 610. For example, if a highest usage probability resource is very large, and several other slightly lower usage probability resources are much smaller in size, the content sequencing algorithms 613 may select the several smaller resources to cache in order to increase the overall probability of satisfying the user's requests when offline and providing a seamless user experience.

As noted above, the content sequencing algorithms 613 may receive user context data as input for determining the set of content resources to be cached on the user device in step 704. In such determinations, a particular user's resource consumption path, consumption velocity, and/or remediation rate may affect the user's usage probability and estimated time of completion for various resources. For example, the set of resources and corresponding usage probabilities shown in table 1010 of FIG. 10A may indicate that User A's consumption path within its professional training or eLearning CDN 600 indicates a likelihood of that this user will request resources in the near future from multiple different training/eLearning courses. In contrast, the set of resources and corresponding usage probabilities shown in table 1020 of FIG. 10B may indicate that User B's consumption path within its media distribution CDN 600 indicates a likelihood of that this user will request resources from a single group of media content resources in the near future (e.g., sequential episodes from a television series). Additionally, the usage probabilities and estimated completion times shown in table 1020 of FIG. 10B may indicate that User B has a high consumption velocity for content resources in the CDN 600, as well as a low remediation rate. In contrast, the usage probabilities and estimated completion times shown in table 1030 of FIG. 10C may indicate that User C has a low consumption velocity and a high remediation rate for content resources (e.g., games and game levels/modules) in its gaming CDN 600.

In step 705, the content sequencer 612 and/or other components of the user device 610 may complete the cache updating process by removing one or more other resources from the cache memory systems (e.g., 618 and 619) in order to free up space, and then loading the resources determined for caching in step 704. The selection of old resources to be removed from the user device 610 may be based on determinations that the resources have been executed/played and completed by the user (e.g., via the user's resource execution status), and that the user is unlikely to request the resources again (e.g., via the user's remediation rate and resource consumption patterns). In other cases, content resources may be selected for removal in step 705 even if they have not been executed at all on the user device 610, or have only been partially executed, based on determinations by the content sequencer 612 that the user is unlikely to request or continue execution of these resources in the near future.

Referring briefly to FIGS. 11A-11C, example memory usage diagrams are shown representing cache memory systems within three different user devices 610. In these examples, content resources have been loaded onto the cache memory systems of three different user devices 610 in accordance with the selections of content resources shown in FIG. 10A-10C. That is, FIG. 11A shows a cache memory system 1110 in which three course modules have been cached on a user device 610 within professional training or eLearning CDN 600, based on determinations of these course modules have the highest likelihood of being requested by User A in the near future while the device is offline. Similarly, FIG. 11B shows a different cache memory system 1120 in which six television program episodes have been cached on a user device 610 within a media distribution CDN 600, based on determinations that these program episodes have the highest likelihood of being requested by User B in the near future while the device is offline. Finally, FIG. 11C shows another cache memory system 1130 in which two interactive game levels have been cached on a user device 610 within gaming CDN 600, based on determinations that these game levels have the highest likelihood of being requested by User C in the near future while the device is offline. Additionally, although the memory diagrams 1110-1130 are represented as single unitary memory structures in these examples, it should be understood that each memory 1110-1130 may comprise multiple different storage systems providing memory accessible to their respective user devices 610. For example, each cache memory system 1110-1130 may be implemented by a combination of a cache memory system 618 and local storage 619, as well as external storage drives, flash memory drives, and other detachable storage devices that may be available to the device 610 after losing network connectivity.

Figure 8:
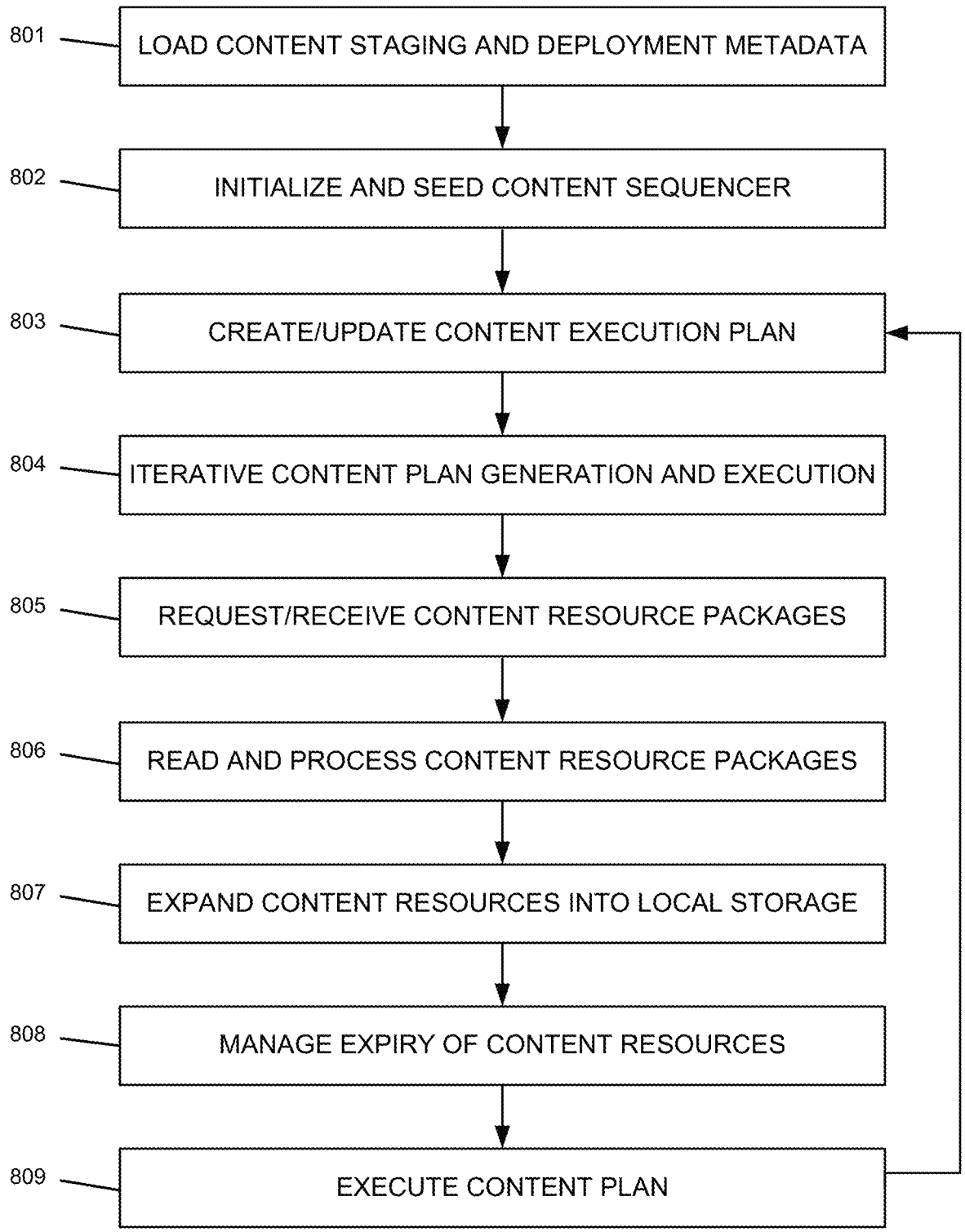
FIG. 8 is a flow diagram illustrating an example process of requesting, receiving, and loading content resources into the cache memory systems of a user device, according to one or more embodiments of the disclosure.

Referring again to FIG. 8, an example process is shown for requesting, receiving, and loading content resources into the cache memory systems of a user device 610. As described below, the steps in this process may be performed by one or more components in the example user device 610 described above, such as the content sequencer 612, content loader 615, and/or content executor 617. However, it should be understood that the processes of requesting retrieving, loading, and executing content resources as described herein need not be limited to the specific systems and hardware implementations described above in FIGS. 1-6, but may be performed within other computing environments comprising other combinations of the hardware and software components, such as client-server systems, cloud-based systems, CDNs having centralized caches and/or multi-tier caches for caching adaptive content, and the like. Additionally, although the example process of FIG. 8 is described below in reference to a professional training or eLearning CDN 600, similar techniques for requesting, receiving, and loading content resources may be performed for other types of CDNs 600 (e.g., gaming CDNs, media distribution CDNs, web services CDNs, etc.).

In various techniques, content caching mechanisms may implement a usage model whereby content resources may be requested and consumed by users in an identical manner whether or not online connectivity is present. Such techniques may be accomplished via a set of metadata that is composed of two main concepts. The first concept may include a set of declarative deployment properties, for example, primarily focusing on cache size, cache expiry policies, time of day, physical location, runtime context, media type and local media space considerations, etc. The second concept may include attributes that take into account the current users connectivity status, type, costing, and an ongoing analysis of their content based pacing/progression information. The metadata may be combined and used by one or more content sequencing algorithm 613 to formulate dynamic content usage plan(s) and to generate a projected set of potential content resources that may be downloaded independently of any content that is currently being consumed via the run-time environment 616. For example, when generating content usage plans for users in a professional training or eLearning CDN, the content sequencing algorithms 613 may use as inputs the current course objectives and levels (among other factors) as a seed to ascertain the programmable window for potentially addressable content.

In step 801, a set of metadata may be loaded for staging and deployment of a set of content resources. For example, in a professional training or eLearning CDN 600, the metadata maintained declaratively for a course or application may include (but is not limited to) items such as cache expiry/eviction semantics, download/update schedules, authentication/authorization semantics, content plan look ahead/behind windows, etc. The metadata also may contain derived network connectivity information associated with the user device 610, for example, link speed, online status, geolocation, repository latency/availability, download method, and content type, and the like. The metadata collected may be used in conjunction with knowledge about the caching mechanism being leveraged to govern the download, unpackaging/extraction, local staging, ingestion of additional asset metadata (possibly incorporated in the asset itself, inferred via type or name, or declared via a manifest document of some type), as well as possibly maintaining some type of version control for requested content resources (or assets) that the caching mechanism may need to account for.

It should be noted that the collection of metadata and the behaviors described in this section are not compulsory and should be viewed as a continuum of capabilities that may be used to augment content staging behavior that is relevant for a given runtime context implementation.

In step 802, a content sequencing engine (e.g., content sequencer 612) may be initialized and seeded with starting content semantics. For example, when a user in a professional training or eLearning CDN 600 executes a course, class, or module first time, or when the user resumes a course, class, or module, the sequencing engine may be seeded with metadata that defines either a specific starting point or range of content to be presented to the user. This seeding process may be the basis for the creation of a content execution plan for the user. The way in which the value for seeding the sequencing engine may be driven by an algorithmic or declarative selection, and thus may be relevant for initial placement purposes within a given set of course content.

In step 803, a content execution plan may be generated for a user and/or user device 610 during an initial execution of this step. As discussed below, step 803 may be executed multiple times, during which the subsequent executions of step 803 may include updating previously generated content execution plans. In this example, a content execution plan corresponds to a generated set of metadata that encapsulates the semantics for a programmable caching window spanning a specific range of content driven by the content staging and deployment metadata. Among the information contained in this metadata may include a candidate set of content resources (or content objects or assets) required to fulfill the plan. Such content sets may span entire sets of content asset packages, for example, for professional training or eLearning courses, that may be need to be cached to support the course content that might be sequenced for a given starting point within a course.

In some embodiments, the content execution plans generated in step 803 may need to take into account content at progressive (or higher) levels, for example, due to comprehension and natural progression through a set of materials, as well as regressive (or lower) levels, for example, due to a user's failing to demonstrate comprehension and or retention for the given set of course resources (e.g., course materials).

The algorithms 613 used to generate content execution plans in step 803 may include, for example, an algorithm that loads a next asset package and never removes any locally cached content, thus creating a progressive, expanding set of locally cached content. Alternatively, such algorithms 613 may take into account individual usage probabilities for the total set of assets specified by the content execution plan, expiry data for cache size (e.g., versioning and time-stamping for last access), as well as online status, download times, and the like. Thus, content execution plans may include dynamically generated sets of possibly addressable packages of content resources (or content asset packages), along with various declarative semantics that control both the size of the programmable caching window and its management of the locally cached content.

In step 805, the content resources (e.g., asset packages) associated with the content execution plan generated in step 804 may be requested and received by the content sequencer 612. For example, the content sequencer 612 may request the determined content resources from the content loader 615, which in turn may request the resources from one or more external content servers 620. In various embodiments, the content loader 615 may retrieve the content resources via one or more real-time delivery repositories (e.g., content server 620) via transports such as HTTP, SSH, TCP, and the like, over various different methods such as streaming, web sockets, content delivery networks, fabric, AMAZON Simple Storage Service (S3), and the like.

In some embodiments, the content loader 615 may be responsible for determining which content repository 620 out of plurality of possible repositories, and which transport (s) out of a plurality of possible transports are applicable for a given package of content resources. The content loader 615 also may provide any necessary authentication and authorization credentials to access the desired content resources. Additionally, the content loader 615 may make determinations regarding the online/offline status of such systems as well as processing the responses for content resource requests. Status notifications may be sent from the content loader 615 to the content sequencer 612 to allow for managing the display of any given content resource packages staging request, including download and connectivity related issues.

In step 806, the content resources (e.g., asset packages) received in step 805 may be read and processed at the user device 610. For example, the content loader 615 may initially write each newly received content resource into local private storage 619 for the cache implementation selected. The type of file and location of the local storage may vary based on the type of caching mechanism that is implemented for different types of content resource packages. For example, the initial storage location selected for a Java Virtual Machine (JVM) class or Java Archive (JAR) file may be different than for the same type of file loaded from a remote MAVEN repository. Of course, it should be understood that the content loader 615 need not be limited to those types of files. Once the content resource package request is completed, the location of the stored package and the download completion status may be transmitted content sequencer 612 for further processing.

In some embodiments, the content resource packages that make up a content execution plan may require some additional post-processing that may allow the resources to be extracted, scanned and addressed, and loaded. Once ready for use, the resources can be utilized for content execution/ playback by a user. This may mean that the resources have been staged to a publicly accessible portion of local storage 618 or 619 that the content executor 617 of the RTE 616 may use for preloading, loading, rendering, receiving user input/ selection, and feedback purposes. As noted above, local storage targets 618 or 619 may include a local directory on the user device 610, a mobile APK file, web browser cache, a memory card, RAM memory, a file on the JAVA CLASS-PATH, files with a local MAVEN repository, etc.

In step 807, the content resource packages received in step 805 may be expanded into local storage (e.g., 618 or 619) on the user device 610. For example, the individual content resource files may be extracted out of the packages. In some cases, the content resource packages may be accessed by methods exposed via the caching implementation, and such packages may reside in a private storage area for the cache. As a content resource package is read and the individual resources extracted, the resources may be written to a publicly accessible local storage area (e.g., within 618 or 619). Depending on the target runtime context and implementation, the content resources may be required to be updated with the appropriate ownership, group, access rights, etc. In such cases, these semantics may be defined within the content staging metadata discussed above.

In step 808, the user device 610 may identify and manage the expiration of various content resources in the received packages. For example, each received content resource package may contain metadata that describes other semantics that may be used for expiry processing in conjunction with the content staging metadata. Such semantics may include, for instance, standard or LO information, file versioning info, file creation and modification dates, verification info such as MD5 or CRC hashes, and/or other file semantics such as sizing and type information. The above metadata used for expiry processing may be contained within a content resource manifest (or asset manifest) associated with the received content resource package. In other example, some or all of this information may be determined by the user device 610 even without a content resource manifest. For example, the metadata within individual content resource files may be analyzed to determine certain expiry information, as such information may be commonly among certain file types such as graphics files. Additionally, some of the above expiry information may be determined by parsing the filename and archiving metadata for each contained content resource file. Regardless of how the metadata for the individual content resource is obtained, each content resource file may be processed using a set of declarative semantics derived from the content and deployment staging metadata discussed above.

The metadata of the content resource files may be used in conjunction with the content deployment and staging metadata, for example, by caching specific application code that may use rules-based declarative statements to govern the programmable caching window. Such examples may allow for either static or dynamic implementations that expire content resource files from both local public and private storage. In some examples, the content sequencer 612 may be responsible for implementing and managing the algorithms that evaluate the expiry semantics for each content resource file, as well as for initiating the physical eviction of any expired content resources. Each time a content resource package is downloaded and processed via the content loader 615, the content sequencer 612 may execute expiry and eviction code to ensure that proper expiry management of the content resource files and packages occurs.

In step 809, the content execution plan(s) determined above in step 803 may be executed by playing/executing individual content resources via the content executor 617 of a run-time environment (RTE) 616. In professional training and eLearning CDNs 600, packages or groups of content resources may include Shareable Content Object (SCOs) and/or Learning Objects (LOs). In some embodiments, a player handler component within the content sequencer 612 may be responsible for communicating the execution plan on an ongoing basis to the content executor 617 within the RTE 616. The player handler within the content sequencer also may receive status updates as to the completion status of the content resources (e.g., SCO/Los) requested to be executed on the user device 610. Therefore, in such examples, the player handler and/or other components within the content sequencer 612 may be responsible for maintaining the execution plan.

Continuing the above example, after the content executor 617 finishes executing a content resource that was specified by the player handler in the content sequencer 612, a response notification may be sent back to the content sequencer 612 by the content executor 617. Such response notifications may indicate either that the entire interactive content of the resource has been completed (e.g., all operations specified for and SCO/LO), or instead that a specified portion of the interactive content has been completed. In the event that the entire interactive content of a resource has been completed, the assets utilized by the resource may be marked for removal from local and private storage, assuming no other content resources in the execution plan will utilize the assets. After the response notification and asset expiry operations have been completed, the execution plan may either be annotated or may have the entry for the completed content resource (e.g., SCO/LO) removed from the execution plan. Additionally, any user interaction data, results, scores, feedback, and the like, associated with the completed content resources may be reviewed and persisted. As discussed above, the compilation of such scoring results may be factored into subsequent iterations for execution plan generation and updating by the content sequencing algorithms 613. Accordingly, the process may return to step 803 in order to update the content execution plan and/or generate a new content execution plan based on the response notifications received from the content executor 617. This cycle may continue until such time as all of the elements in the content execution plan have been addressed. Once this occurs, content sequencer 612 may generate a new execution plan using the content sequencing algorithms, and the execution of the new plan may begin.

Figure 9:
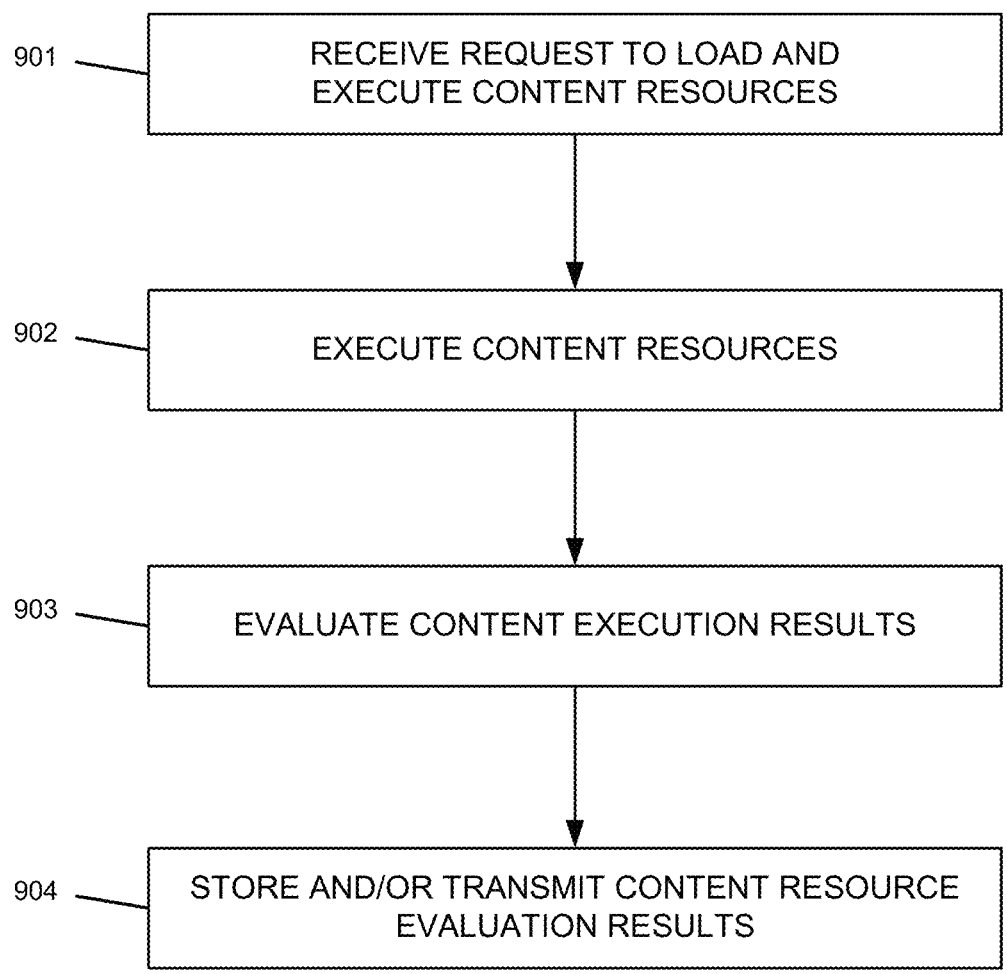
FIG. 9 is a flow diagram illustrating an example process of executing content resources on a user device, according to one or more embodiments of the disclosure.

Referring again to FIG. 9, an example process is shown for executing/playing content resources on a user device. As described below, the steps in this process may be performed by one or more components in the example user device 610 described above, such as the content sequencer 612 and content executor 617. However, it should be understood that the processes of executing content resources and evaluating the results content execution described herein need not be limited to the specific systems and hardware implementations described above in FIGS. 1-6, but may be performed within other computing environments comprising other combinations of the hardware and software components, such as client-server systems, cloud-based systems, CDNs having centralized caches and/or multi-tier caches for caching adaptive content, and the like. Additionally, although the example process of FIG. 9 is described below in reference to a professional training or eLearning CDN 600, similar techniques for requesting, receiving, and loading content resources may be performed for other types of CDNs 600 (e.g., gaming CDNs, media distribution CDNs, web services CDNs, etc.).

In some embodiments, the execution of content resources described in this example may adhere to the caching content metadata semantics and content execution plan described above in reference to FIG. 8. For example, the content executor 617 within the RTE 616 may adhere to implementing content staging and deployment metadata semantics by mapping RTE 616 rendering, accessibility, scoring, and other observable playback behaviors from the metadata configuration elements that may affect the playback of content resource or its user interactions/responses to the content executor 617. Because RTS 611 may be responsible for content sequencing, the RTE 616 may evaluate but not score the result for each set of collected responses for a given piece of content (e.g., a SCO/LO). The notification of content evaluation responses may be processed by a handler within the RTS 611, marking the content resource as presented, which may result in the content sequencing algorithms 613 finalizing the score for the requested resource. These notification and processing steps may be decoupled, and RTE 616 might only receive an acknowledgement back from the handler within the RTS 611 that the evaluation results have been received. In this manner, the RTE 616 may participate in closing the loop for adherence to content execution plans.

In this example, an asset or content object associated with a content resource (e.g., a SCO/LO) is not able to be displayed in a timely fashion, or if the content resource itself is not accessible or cached, the content staging and deployment metadata may be consulted for how to proceed. For example this might result in a dialog box being displayed and the RTE 616 responding to the RTS 611 with an appropriate non-scoring related message that may be logged and displayed to the user. The RTS 611 then may take the appropriate action, for example, retrying to access the content resource in the local cache and re-extracting it from its content resource package, attempting to re-download the required content if the online status allows, and/or potentially terminating execution of the content resource and/or content plan until the desired online status is encountered.

In some cases, if the RTE 616 is deployed in a runtime context different from the RTS 111 (e.g., another Java Virtual Machine, a web browser plugin, an application package or executable, etc.), then an exchange of the content staging and deployment metadata may occur over the implemented communication medium such as web sockets or some other appropriate messaging transport. The exchange of such a message sequence for these purposes may be part of the establishment of the messaging channel to bootstrap the RTE 116.

In step 901, one or more content resources may be executed on the user device 610, for example, using a content executor 617 running in a run-time environment 616. For example, in a professional training and eLearning CDN 600, the content resources may include Shareable Content Objects (SCOs) and/or Learning Objects (LOs), each of which may include one or more content resources. When executing the content resources for a specific SCO/LO, or executing other content resources for other CDNs 600, the RTE 616 may perform several steps. First, the RTE 616 may render the graphical content and play the corresponding audio in order for a user to be able to interact with the content resource. As discussed above, during rendering the RTE 616 may identify certain special accessibility issues that make the content resource usable to users with disabilities. For example, the RTE 616 may provide on-screen text for certain content, as well as magnifying text and images as the mouse or other pointing device moves to navigate the content. The RTE 616 also may receive and use haptic feedback, as well as allowing for additional time for a user to respond or read and reply to on-screen and/or audio content. These features also may affect the content resource selection and scoring evaluations performed by the RTE 616 and/or RTS 611.

In step 902, the results of the content execution may be evaluated and/or scored, and in step 903 the evaluation results may be transmitted and/or stored. Steps 902 and 903 may be performed by the RTE 616, RTS 611, or a combination of the RTE 616 and RTS 611. For example, in some embodiments, the RTE 616 may receive and score feedback from users associated with specific content resources, and transmit the feedback scores to the RTS 611. In other embodiments, the RTE 616 might only receive the feedback and render proper responses following user interactions, as well as recording and transmitting the user interaction data (e.g., feedback and results) to the RTS 611 for analysis and processing. The user feedback received in various examples may include any type of user interaction data, including user selections (e.g., selections of content resources, starting, stopping, pausing, skipping ahead or back, etc.), responses to decision/navigation points, user behaviors (e.g., text inputs, audio, gestures, etc.), scores (e.g., of game levels, eLearning modules, etc.), answers to explicit requests for feedback or evaluations by content resources, etc. Such feedback also may be referred to as clickstream processing. Additional clickstream processing/feedback data may include harvesting additional metrics relating to a user's interaction with the content, such as amount of time taken to make a selection, the number of selections/attempts for a given navigation point or presentation of content, and any aids, tools, or help that the user used when interacting with the content. In some embodiments, the RTE 616 may collect the user feedback/clickstream data and transmit the data to the RTS 611 for scoring. Additional operations such as aggregation, reporting, and final analysis may be perform through further processing and analysis, which may occur in batches or in real time (or near real-time) depending on the processing methodology applied.

Certain techniques discussed above relate to advanced identifying and caching of content resources in order to provide a seamless user experience for executing (or consuming) content resources, regardless of network connectivity status. For example, as discussed above in reference to FIGS. 7-11, a set of adaptive content resources having high likelihoods of selection on a user device 610 may be cached locally on the device, so that the adaptive content resources may be available via the user device 610 even after the device loses network connectivity. Additionally, according to further aspects described herein, the caching of content resources onto a user device 610 (including adaptive and non-adaptive resources) may be based patterns of network availability for the device 610 as well as patterns of resource usage on the device 610.

Figure 12:
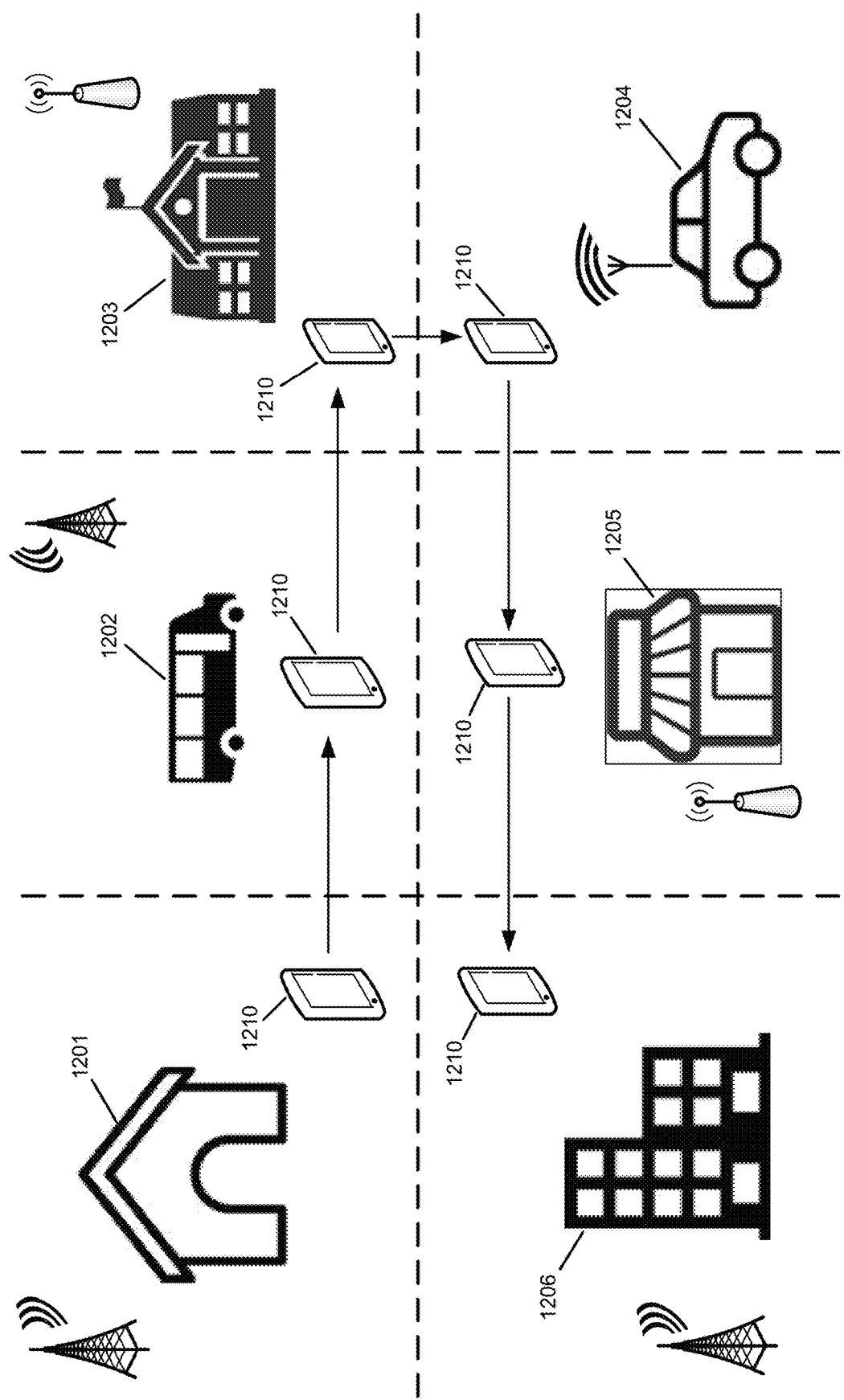
FIG. 12 is an example diagram illustrating a sequence of network availability scenarios for a mobile device, according to one or more embodiments of the disclosure.

Referring now to FIG. 12, an example diagram is shown illustrating a sequence of network availability scenarios for a mobile device 1210. Although this diagram is only a simple example, it illustrates the changing and variable network conditions experienced by many mobile devices 1210 (e.g., laptops, tablets, smartphones, smart watches, wearable computing devices, vehicle-based devices, etc.) on a daily basis. In this example, mobile device 1210 begins the day at home location 1201 having access to a home WiFi network. Next, the mobile device 1210 travels on a bus 1202 with intermittent access to cellular data networks. The mobile device 1210 then arrives at a school 1203 and gains access to the school's LAN or WiFi network. After school, the mobile device 1210 travels by car, potentially having access to an in-car WiFi hotspot as well as additional periodic cellular data networks. The mobile device 1210 then stops at a coffee shop 1205 and accesses the coffee shop's free public WiFi. Finally, the mobile device 1210 ends the day at a work location 1206 having access to the employer's LAN or WiFi network.

As this example illustrates, certain mobile devices 1210 may be associated with various home networks, work networks, school networks, vehicle-based networks, commonly used public networks, and the like. Each such communication network may be of a unique network type and/or have unique network characteristics. For example, each network shown in FIG. 12 may have a unique set of network characteristics and restrictions, such as network types, network protocols and ports used, security features, numbers and types of supported devices, content restrictions, time restrictions, data usage restrictions, download and/or upload limits, base costs and/or overage costs for network access, and the like. Thus, in some cases a mobile device 1210 may have unlimited access to retrieve any requested content resources via certain specific mobile networks, while in other cases the request and retrieval of specific content resources may be restricted to specific networks and/or specific retrieval times.

Additionally, a mobile device 1210 may have device-specific patterns of network connectivity patterns with respect to one or more communication networks. Such patterns of network connectivity may include the amounts of time that a mobile device 1210 spends connected to (or within range of and able to connect to) one or more different mobile networks. For example, a mobile device 1210 may spend 12 hours per day connected to a home network, 25 hours per week connected to a school network, 15 hours per week connected to a work network, 10 hours per month connected to a municipal WiFi network, and so on. Additionally, such network connectivity patterns may include the specific times or time ranges during which a mobile device 1210 is likely to be connected to each network, and/or associated probabilities of the mobile device 1210 being connected to (or within range of) the networks during the specified times or time ranges. For example, a certain mobile device 1210 may have a 95% probability of being connected to the user's home WiFi network for at least 6 hours between 10 pm and 6 am on weekdays, an 85% probability of being connected to a work network sometime between 8 am and 4 pm, a 10% probability of being connected to a free public library WiFi during the weekend afternoons, and so on. An example network connectivity pattern for a mobile device 1210 is shown in table 1400 of FIG. 14, discussed below.

The data used to establish such network connectivity patterns may be determined manually (e.g., via user inputs identifying network names, connection times, etc.), or automatically by monitoring the set of mobile networks that are accessible to a mobile device 1210 at different times and in different locations. Such network connectivity patterns also may include data describing the quality of the network connections (e.g., signal strength, available bandwidth, stability of connection, etc.) associated with different networks and/or at various times and locations. Additionally, receiving, analyzing, and storing network connectivity pattern data may include identifying times of no network connectivity or limited network connectivity, for example, the specific days, times, time ranges (along with associated probabilities) during which the mobile device 1210 does not have network connectivity.

As discussed below, in addition to network connectivity patterns for mobile devices 1210, patterns may be determined relating to the usage of content resources by mobile devices 1210. For example, referring again to FIG. 12, a set of resource usage patterns may be established for the mobile device 1210 with reference to times, dates, locations, and/or networks associated with requests and execution of certain types of content resources on the mobile device 1210. For example, a resource usage pattern may be determined for a mobile device 1210, in which a user of the mobile device 1210 generally requests and plays a television program from a media CDN 600 between 7 am and 8 am on weekday mornings (e.g., regardless of location or network), generally requests and executes an interactive game from a gaming CDN 600 whenever the user is at the coffee shop 1205 (i.e., regardless of time), and generally requests and executes a specific professional training or eLearning course whenever the user is on the bus 1202. Similarly to the network connectivity patterns, each determined pattern of resource usage for a mobile device may have an associated probability corresponding to the likelihood of the mobile device 1210 executing the predicted type of content resource at the predicted time or location and/or via the predicted network. Additionally, as with network connectivity patterns, the resource usage patterns for a mobile device 1210 may be determined manually (e.g., by receiving user input) or automatically by monitoring requests and execution of various types of content resources by the mobile device 1210 at different times and locations. An example resource usage pattern for a mobile device 1210 is shown in table 1500 of FIG. 15, discussed below.

Figure 13:
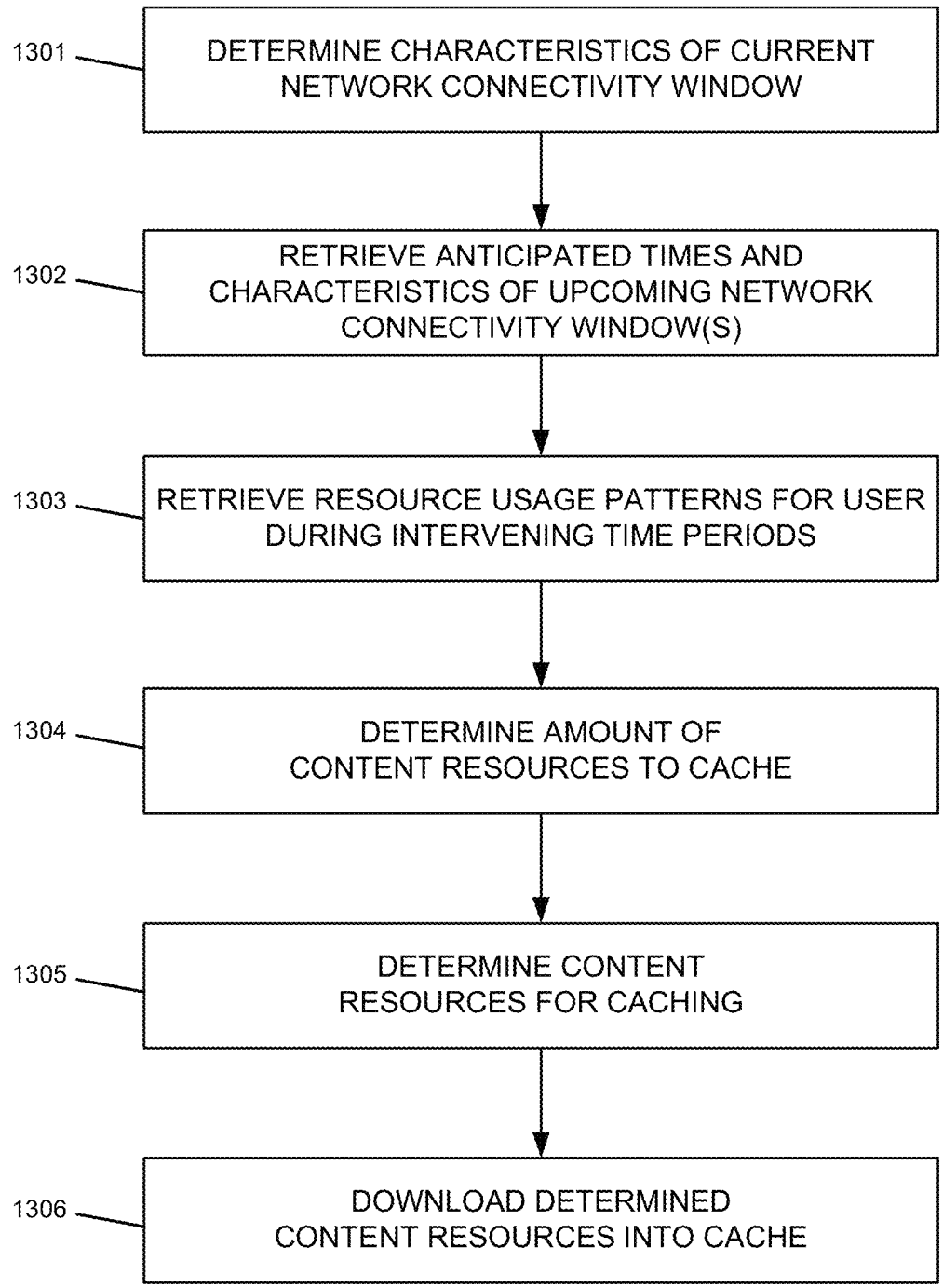
FIG. 13 is a flow diagram illustrating an example process of determining and downloading one or more content resources into a cache on a user device, according to one or more embodiments of the disclosure.

Referring now to FIG. 13, a flow diagram is shown illustrating an example process of determining and downloading one or more content resources into a cache on a user device. As described below, the steps in this process may be performed by one or more components in a mobile device, such as a laptop computer, tablet computer, smart phone, smart watch, wearable computing device, or vehicle-based computing system. In some cases, such mobile devices may include some or all of the features of the user device 610 (and/or user devices 106), discussed above. However, it should be understood that the processes of determining and retrieving network connectivity patterns and resource usage patterns, determining content resources for caching, and downloading content resources onto computing devices, need not be limited to the specific systems and hardware implementations described above in FIGS. 1-6, but may be performed within other computing environments comprising other combinations of the hardware and software components described herein.

In step 1301, a mobile device 1210 (e.g., user devices 610 and/or 106), such as a laptop, tablet, smart phone, vehicle-based device, etc., may begin the process of determining how many and which content resources to cache locally, by determining the characteristics of its current network connectivity window. As illustrated in FIG. 12, a mobile device may travel from location to location and network to network, during which different network connectivity options and characteristics may apply. For example, the mobile device 1210 may detect its current location, one or more connected wired network options and/or wireless networks within the current reception range of the mobile device 1210. For each identified communication network, the mobile device 1210 may determine various network properties, such as network name, network type, network protocols and ports used, various security features of the network, the numbers and types of devices supported by the network, as well as the current quality of the network connection (e.g., signal strength, available bandwidth, stability of connection, etc.). The user device 1210 also may determine if the communication network includes any content restrictions, time restrictions, data usage restrictions, bandwidth limitations, download or upload restrictions, as well as cost factors associated with each networks (e.g., per minute or per data amount network access charges, current network subscriptions, amount of data remaining in subscription predefined data limits, overage charges or costs of purchasing additional data amounts, etc.).

The network characteristic data determined in step 1301 may be retrieved and/or determined by the mobile device 1210 from various different sources. For example, upon connecting to a new network, the mobile device 1210 may contact a network router or server to retrieve certain network characteristics (e.g., network type, protocols, ports, security features, network performance, restrictions, cost factors, etc.). Additionally or alternatively, certain data may be entered manually by users of the mobile device 1210, where users may identify preferred networks, network access costs and subscriptions, etc. Mobile devices 1210 also may be configured to detect and/or test certain network characteristics such as signal strength, maximum bandwidth, network stability, and the like, rather than receiving such data from an external source. Further, in some embodiments, mobile devices 1210 may contact one or more external servers (e.g., network provider servers) to retrieve additional data regarding network conditions, network costs, and the like.

In step 1302, the mobile device 1210 may retrieve data identifying one or more potential anticipated times, locations, and/or networks associated the mobile device 1210. For example, the mobile device 1210 may use the current time, current location, and/or current network conditions to determine one or more upcoming time windows of network connectivity, limited connectivity, or non-connectivity. In some embodiments, the mobile device 1210 may retrieve various network connectivity pattern data and correlate that data with the current conditions of the mobile device 1210, in order to predict a future network connectivity state for the device 1210 within a probability threshold.

For example, referring briefly to FIG. 14, a mobile device 1210 may access and retrieve network connectivity pattern data such as the example data shown in table 1400. The network connectivity pattern data may be stored locally within the memory of the mobile device 1210, or may be stored by and retrieved from an external server or other device in a CDN 600. In some embodiments, the mobile device 1210 may use such data to determine future probable network connectivity states based on the current time, current device location, current device network status, and the like. For instance, if the current time is 8:50 pm on Monday night, the mobile device 1210 may access the example network connectivity pattern data in table 1400 to determine that there is a high likelihood (98%) of the device 1210 returning to its home network ("HOME_NET"), which has high bandwidth, unlimited data usages, and no excess costs, in the near future. In contrast, if the current time is 8:15 am on Saturday morning, the mobile device 1210 may use table 1400 to determine that there is a reasonable likelihood (54%) of the device 1210 losing all network connectivity in the near future. As yet another example, if the current time is 5:20 am on Friday morning, the mobile device 1210 may use table 1400 to determine that there is a good likelihood (72%) that the mobile device 1210 will soon be removed from its home network and will have intermittent network access only via mobile cellular networks having less bandwidth and potential data changes.

In step 1303, the mobile device 1210 may retrieve data corresponding to resource usage patterns associated with the device 1210 and/or current users) of the device 1210. potential anticipated times, locations, and/or networks associated the mobile device 1210. In some embodiments, the mobile device 1210 may retrieve various resource usage pattern data and correlate that data with the current conditions of the mobile device 1210, in order to predict one or more future requests for content resources on the device 1210. As in step 1302, the mobile device 1210 may use the current time, current location, and/or current network conditions retrieve the pattern data and/or make predictions regarding likely requests for content resources.

For example, referring briefly to FIG. 15, the mobile device 1210 may access and retrieve resource usage pattern data such as the example data shown in table 1500. The resource usage pattern data may be stored locally within the memory of the mobile device 1210, or may be stored by and retrieved from an external server or other device in a CDN 600. In some embodiments, the mobile device 1210 may use such data to determine future potential user requests for content resources, based on the current time, current device location, current device network status, and the like. For instance, if the current time is 5:15 am on Tuesday morning, the mobile device 1210 may access the example resource usage pattern data in table 1500 to determine that there is a fair likelihood (60%) that a user will use the device 1210 to play a specific interactive game ("Game ABC") for at least 45 minutes during the next two hours. As another example, if the current time is 2:55 pm on Wednesday afternoon, the mobile device 1210 may access the example resource usage pattern data in table 1500 to determine that there is a good likelihood (75%) that a user will request and play a 50-minute video lecture from Course 1 of an eLearning CDN 600 in the near future, and also a reasonable probability that the user will request and read 90 minutes of a text content resource from Course 2 during the same time window.

In step 1304, the mobile device 1210 may determine an amount of content resources to cache, and in step 1305, the mobile device 1210 may determine the specific set(s) of content resources to cache on the mobile device 1210. These determinations may be performed based on the characteristics of the current network connectivity window (step 1301), the characteristics of the anticipated upcoming network connectivity windows (step 1302), and the resource usage pattern data associated with the anticipated upcoming network connectivity windows (step 1303). For example, if the current network connectivity characteristics are more favorable for requesting and downloading data (e.g., high bandwidth, no data limits, no content restrictions, no associated network costs, etc.), and the anticipated upcoming network connectivity windows have less favorable characteristics for requesting and downloading data (e.g., no connectivity, or connectivity with lower bandwidth, data limits, network costs, content restrictions, etc.), then the mobile device 1210 may determine that content resources should be cached during the current network connectivity window rather than during a future window. In contrast, the mobile device 1210 may determine that an anticipated upcoming network connectivity window (with a sufficiently high probability) has more favorable network conditions than the current network connectivity window, in which case the mobile device 1210 may determine not to cache any additional content resources during the current network connectivity window.

Assuming the mobile device 1210 determines that one or more content resources should be cached during the current network connectivity window, the mobile device 1210 may determine the amount of content resources to cache based on the anticipated amount of time until a next favorable network connectivity window, as well as based on the resource usage patterns of the user during the relevant time windows. For example, if the mobile device 1210 determines that many hours of unfavorable network connectivity (or no connectivity) are anticipated before next returning to a favorable network connectivity window, and also determines that the resource usage patterns for the device 1210 during the interim time period indicates a likelihood that a user will execute a large number (or amount) of content resources between the current time and the next favorable network connectivity window, then the mobile device 1210 may determine in step 1304 that a large number (or amount) of content resources should be cached. In contrast, if the mobile device 1210 determines that only a small amount of unfavorable network connectivity (or no connectivity) is anticipated before next returning to a favorable network connectivity window, and/or that the resource usage patterns for the device 1210 during the interim time period indicates that it is unlikely that a user will execute a significant number (or amount) of content resources during this time, then the mobile device 1210 may determine in step 1304 that a relatively small number (or amount) of content resources should be cached. The determination of the number or amount of content resources to cache in step 1304 also may be based on the physical limitations of the user device 610, for example, the size of the cache memory system 618 and local storage 619, etc.

In some embodiments, the determination in step 1305 of which specific content resources to cache on the mobile device 1210 may be based on the probabilities of different content resources being requested for execution during the relevant time window (e.g., between the current time until the next favorable network connectivity window). For example, a first content resource having a 90% probability of execution by a user during a relevant time window may be selected in step 1305 over a second content resource having only a 60% probability of execution by a user during the relevant time window, or alternatively both content resources may be selected for caching. The determination in step 1305 also may be connected to the determination in step 1304, and may be further based on the usage time of the various content resources. For example, if the mobile device 1210 determines in step 1304 that a large amount of content resources should be cached, the selection of specific resources in step 1305 may be affected. For example, if limited cache space on the mobile device 1210 prevents a sufficient amount of larger resources (e.g., HD video files, graphics-based games, etc.) to be downloaded to cover the relevant time period, then the mobile device may select smaller content resources (e.g., audio files, eBooks or text-based resources, lower quality video, etc.) having a sufficient amount of aggregated usage time to cover the relevant time period. For instance, if a full-day time window of no network connectivity is anticipated, during which 8-10 hours of usage resource usage is anticipated on the mobile device 1210, and the local cache(s) of the device 1210 can only store 2 hours of the highest probability content resources, then the mobile device 1210 may determine instead to store 8-10 hours of smaller-sized lesser probability content resources.

In step 1306, the content resources determined in step 1305 may be downloaded onto the mobile device 1210 during the current network connectivity window. As discussed above, the content resources may include individual resources (e.g., media files, objects, or assets) or groups of related content resources (e.g., content packages, interactive games and media series and games, SCOs/LOs, etc.). After the content resources have been identified, the resources may be requested and downloaded from one or more external content repositories (e.g., content servers 620) using similar techniques to those discussed above in reference to FIGS. 7-8.

Various techniques discussed above described caching determinations and caching behaviors that may be performed by a user device 610 connected to one or more content distribution networks 600. Many of the above techniques may be performed independently by a single user device 610. However, according to additional aspects of the invention, caching determinations and caching behaviors may be coordinated among multiple different user devices 610 associated with the same users and/or the same CDNs 600.

Figure 16:
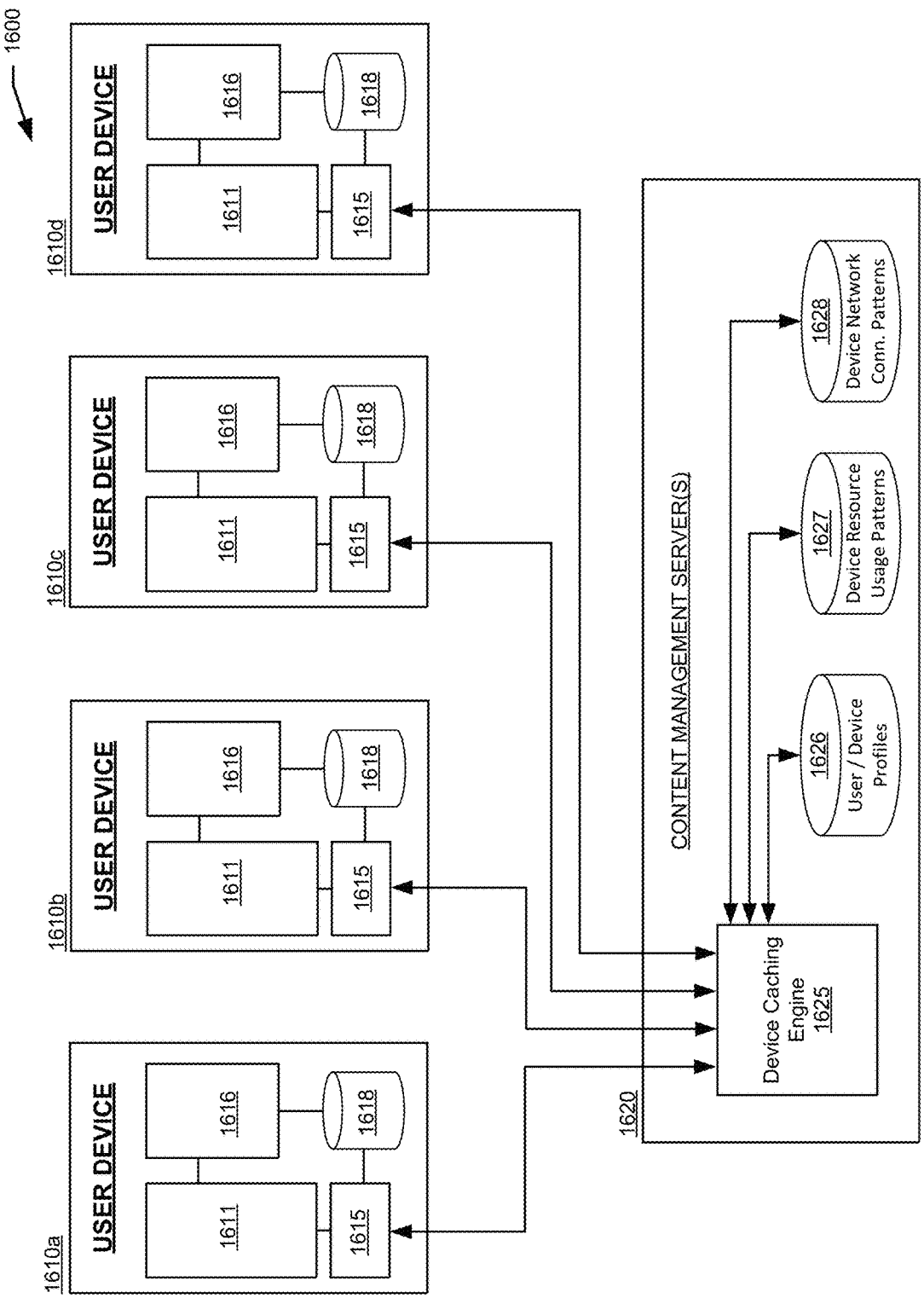
FIG. 16 is a block diagram illustrating an example of a cache system including multiple user devices, according to one or more embodiments of the disclosure.

Referring now to FIG. 16, a block diagram is shown illustrating another example of a cache system 600, including multiple user devices 1610*a*-1610*d*, and one or more content management servers 1620. As discussed below, cache systems such as system 1600 in this example may be integrated within or configured to operate in collaboration with one or more CDNs 100, including professional training and eLearning CDNs, media distribution CDNs, gaming CDNs, enterprise application systems, websites and other Internet-based systems, etc. Thus, content management servers 1620 may correspond to one or more content servers 112, content management servers 102, and/or data store servers 104, discussed above. In order to perform the features described herein, each of the components and sub-components discussed in the example cache system 1600 may correspond to a single computer server or a complex computing system including a combination of computing devices, storage devices, network components, etc. Each of these components and their respective subcomponents may be implemented in hardware, software, or a combination thereof. Further, certain components may include special purpose hardware devices and/or special purpose software, such as those included in the run-time service 1611, content loader 1615, run-time environment 616, and cache memory systems 618 of the user devices 1610, as well as the device caching engine 1625, user and device profile data store 1626, device resource usage pattern data store 1627, and device network connectivity pattern data store 1628 within the content management server 1620.

User devices 1610 may include any types of computing devices discussed above in connection with user devices 106, 610, and 1210, etc. For example, one or more user device 1610 may include desktop computers, servers, television set-top boxes, and home gaming systems, while other user devices 1610 may include various mobile devices such as laptop computers, tablet computers, smart phones, smart watches, wearable computing devices, and vehicle-based computing systems. As shown in this example, each user device 1610 may include some or all of the components of user device 610, discussed above. For example, each user device 1610 may include a run-time service (RTS) 1611 including a content sequencer, a content loader 1615, a run-time environment 1616 with a content executor, and one or more cache memory systems 1618. However, it should be understood that these examples of user device architectures are illustrative and non-limiting, and that different configurations of hardware, software, and network components may be used in different user devices 1610.

In some embodiments, each of the user devices 1610 may be associated with the same user, although such associations may be exclusive or non-exclusive. For example, a user may have one or more personal mobile devices 1610 (e.g., a laptop, a smartphone, a tablet computer, etc.) that are generally not shared with other users. However, other user devices 1610, such as home, work, or school desktop computer, gaming systems, vehicle-based systems, and the like, may be regularly shared by multiple different users. Accordingly, for both the exclusive or non-exclusive user devices 1610 associated a user, the system 1600 may determine when the user is in possession of (e.g., currently using or located nearby) each device, as opposed to when another user is in possession of the device 1610 or when the device 1610 is inaccessible to all users. Such determinations may be performed by the user devices 1610 themselves and/or the content management server 1620. In some cases, user login/ authentication data may be used to determine which user is currently using a shared device 1610. In other cases, matching location data and/or device-to-device communications may be used to confirm the identity of users of shared devices 1610, and also when unshared devices 1610 are nearby and available.

Additionally or alternatively, user device usage pattern data may be used to determine which devices 1610 the user is likely to be in possession of at a given time.

For each user device 1610, resource usage patterns as well as network connectivity patterns may be determined, using similar techniques to those discussed above in reference to FIGS. 12-15. Additionally, for each device 1610, device-user patterns may be determined to identify which users are typically in possession of and/or using each user device 1610 at which times. For example, a personal mobile device 1610 may be generally in possession of a single user at all times, whereas a desktop computer 1610, home gaming system, or the like may be in the possession of different users (or no user at all) at various different times. As with the resource usage patterns and network connectivity patterns, the device-user patterns may include times/days sections mapped to associated users and corresponding probabilities.

Content management server 1620 may correspond to content management server 620, discussed above, including one or more repositories for CDN content resources (e.g., content servers 112), data store servers 104, administrative servers 116, and other CDN servers and devices discussed above. In this example, content management server 1620 also includes a device/user profile data store 1626 which may store records of the content resources currently cached within each user device 1610. Data store 1626 also may store the device-user pattern data discussed above. Device resource usage pattern data store 1627 and device network connectivity pattern data store 1628 may receive and store resource usage pattern data and network connectivity pattern data, respectively, for each associated user device 1610. Additionally, the content management server 1620 includes a device caching engine, which may analyze the current caches of each user device 1610, perform additional analyses as described herein, and perform various caching determinations and caching behaviors for the multiple different user devices 1610. It should be noted that in some embodiments, the content management server 1620 may be optional, and the caching determinations and caching behaviors discussed herein may be performed by one or more caching engines within the individual user devices 1610, which may be configured to communicate directly with one another.

Figure 17:
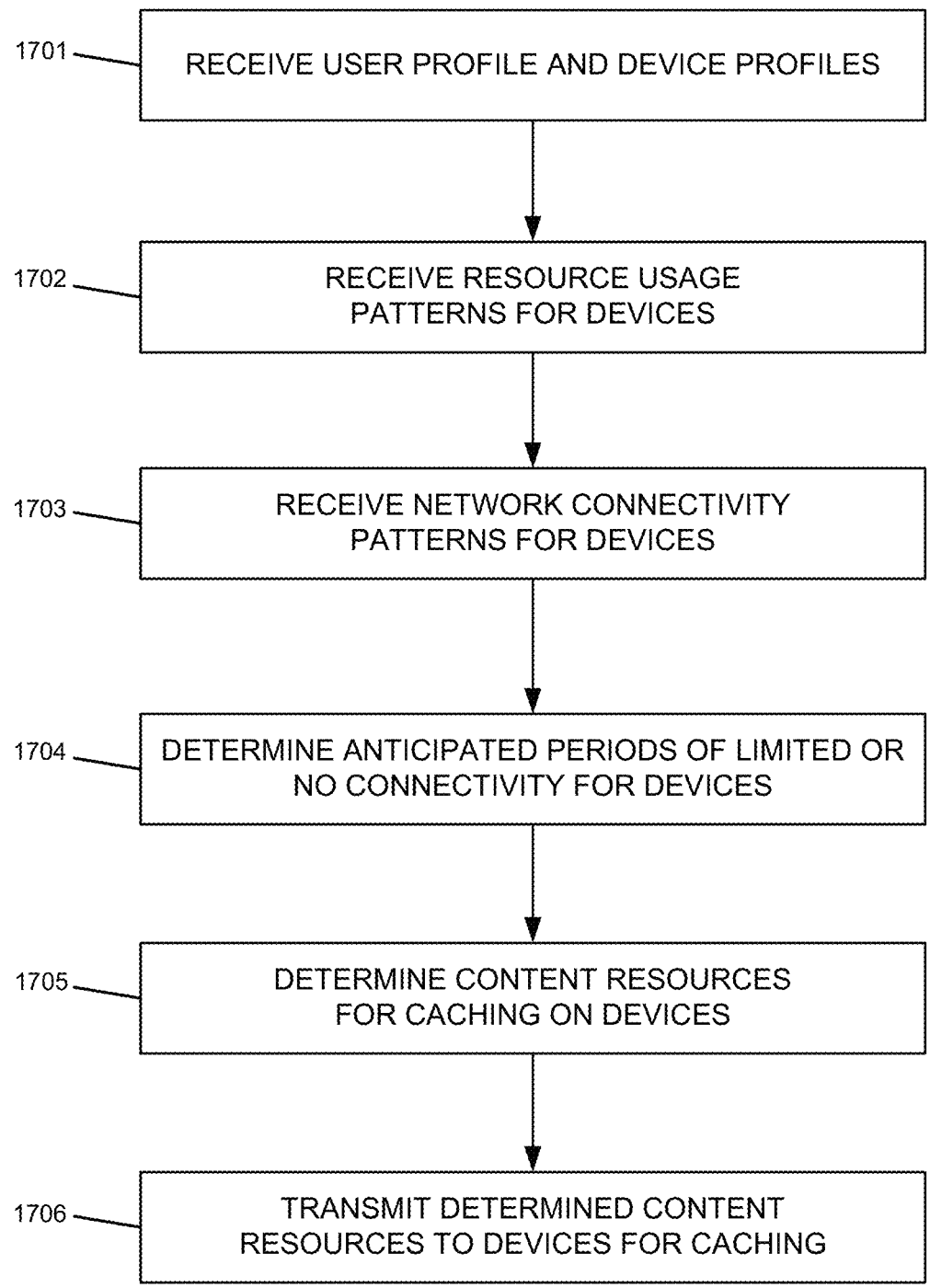
FIG. 17 is a flow diagram illustrating an example process of caching content resources on a plurality of user devices, according to one or more embodiments of the disclosure.

Referring now to FIG. 17, a flow diagram is shown illustrating a process of caching content resources onto multiple user devices. As described below, the steps in this process may be performed by one or more components in the example cache system 1600, such as the device caching engine 1625 within the content management server 1620. However, it should be understood that the processes of evaluating data relating to multiple user devices and performing caching determinations and caching behaviors need not be limited to the specific systems and hardware implementations described above, but may be performed within other computing environments comprising other combinations of the hardware and software components.

In step 1701, the content management server 1620 may receive user profile data and/or device profile data associated with one or more user devices 1610. In some embodiments, the device caching engine 1625 may retrieve such data from the user and device profile data store 1626 for a plurality of different user devices 1610. Alternatively or additionally, the device caching engine 1625 may receive user profile and/or device profile data directly from the user devices 1610 themselves. In some cases, the data received in step 1701 may include the current contents of each cache system/local memory 618 of each user device 1610, for example, the list of current cached content resources (e.g., assets, objects, files, and packages) currently stored on each device 1610. The data received by the device caching engine 1625 also may include the current execution status of each of the content resources on the devices 1610, as well as the user interactions and other user context data collected by the respective devices 1610 during execution of the content resources. Such data may include, for one or more content resources on a device 1610, whether or not the content resource has been played/executed, the completion status or current playback point (for in-progress resources), the amount of time the user has spent during execution of the resource, the user's current scores, responses, and status with respect to the resource, and/or any user other feedback detected and stored in connection with the user's execution of the content resources.

Additional data received in step 1701 may include the device-user pattern data discussed above in reference to data store 1626. For example, the device caching engine 1625 may retrieve from data store 1626 (or directly from the user devices 1610) data identifying which users are typically in possession of and/or using the user device 1610 at various different times. Additionally, in step 1701 the device caching engine 1625 may retrieve a set of device capabilities for each user device 1610. Such device capabilities may include the total and currently available amounts of cache memory and/or local storage 618 on the user devices 1610, as well as various processing, input, and output capabilities of the device. As discussed below in more detail, different user devices 1610 may have different levels of compatibility and/or user effectiveness for executing different types of content resources.

In step 1702, the content management server 1620 may receive resource usage pattern data for one or more user devices 1610. The types of data retrieved, as well as the processes and techniques used in step 1702, may be similar or identical to those discussed above in step 1303. In some embodiments, the device caching engine 1625 may retrieve such data in step 1702 from the resource usage pattern data store 1627 for a plurality of different user devices 1610. Alternatively or additionally, the device caching engine 1625 may communicate directly with the individual user devices 1610 to request and retrieve the resource usage pattern data for each device 1610.

In step 1703, the content management server 1620 may receive network connectivity pattern data for one or more user devices 1610. The types of data retrieved, as well as the processes and techniques used in step 1703, may be similar or identical to those discussed above in steps 1301 and 1302. In some embodiments, the device caching engine 1625 may retrieve such data in step 1703 from the device network connectivity pattern data store 1628 for a plurality of different user devices 1610. Alternatively or additionally, the device caching engine 1625 may communicate directly with the individual user devices 1610 to request and retrieve the network connectivity pattern data for each device 1610.

In step 1704, the content management server 1620 may analyze the data received in steps 1701-1703 in order to determine one or more anticipated periods of no network connectivity or limited network connectivity for the user devices 1610. In some embodiments, the device caching engine 1625 may use similar processes and techniques to those discussed above in step 1304. However, instead of determining anticipated periods of limited or no network connectivity for a single device, the device caching engine 1625 may perform a user-centric determination of periods of limited or no network connectivity, by considering the device-user profile data, and the network connectivity pattern data for all user devices 1610 associated with the user.

As an example, the device caching engine 1625 may analyze the device-user profile data received in step 1701 and the network connectivity patterns received in step 1703, to predict which user devices 1610 will be available to the user and will have sufficient network connectivity during one or more upcoming time windows. For instance, for an upcoming future time window, the device caching engine 1625 may initially identify one or more user devices 1610 that are likely to be inaccessible to the user during the time window. The device caching engine 1625 may determine these devices 1610 are likely to be turned off, away from the physical location of the user, and/or being used by a different user during this future time window. For the remaining user devices 1610, that is, the user devices 1610 that are likely to be available to and in the possession of the user during the future time window, the device caching engine 1625 may use the network connectivity pattern data for these devices to determine the likely network connectivity status for each of these remaining devices 1610, as discussed above in reference to FIGS. 13-14.

These processes and techniques may be repeated for each future time window, in order to identify anticipated periods of limited or no network connectivity for the collective set of devices associated with the user. As discussed below, these anticipated periods of limited or no connectivity may be used when making caching determinations in step 1705. For example, when only some of a user's devices 1610 are anticipated to be unavailable and/or without network connectivity, but other devices 1610 may be available to the user and have connectivity, then it might not be necessary or desirable to cache content resources onto any of the user's devices 1610. However, during a time period when all of the user's devices 1610 are either unavailable to the user, or are available but without network connectivity, then it may be desirable to determine and caching content resources on various devices in steps 1705 and 1706.

In step 1705, the content management server 1620 may determine one or more sets of content resources for caching at the various user devices 1610. In some embodiments, the device caching engine 1625 may use similar or identical processes and techniques to those discussed above in step 1305 to determine specific content resources and groups of content resources to be cached on specific user devices 1610. However, instead of determining a set of content resources to be cached on a single user device 1610, the device caching engine 1625 may perform user-centric caching determinations to identify multiple different sets of content resources that may be cached on multiple different devices 1610 associated with the user.

In some embodiments, the caching determinations in step 1705 may be performed only for single user device 1610 or a subset of the user devices 1610 associated with the user. For example, for any user devices 1610 anticipated to be inaccessible to the user during the relevant time window of limited or no connectivity (e.g., devices that are not at the same physical location as the user, devices being used by a different user, etc.), then the device caching engine 1625 may exclude such devices from the caching determinations in step 1705 for that time window. Rather, the device caching engine 1625 might only determine sets of content resources for caching for any devices 1610 that are anticipated to be in the possession of the user, but having limited or no connectivity, during the relevant time window, such as the user's personal mobile devices 1610.

When caching determinations are performed for multiple different user devices 1610 in step 1705, these caching determinations may be coordinated among the multiple devices, rather than performing separate unrelated caching determinations for each user device 1610. In some cases, the cache systems 1618 of multiple user devices 1610 may be treated collectively as a single cache. For example, if a user is in possession of multiple devices 1610 during a period of no connectivity (e.g., a laptop, a tablet, and a smartphone), device caching engine 1625 may select different sets of content resources to be cached on each device, rather than caching certain resources on multiple different devices 1610. Thus, by managing the cache systems 1618 of multiple devices 1610 as a single cache, the device caching engine 1625 may eliminate duplicate cached resources and effectively create a larger multi-device cache capable of storing larger amounts of content resources. In some cases, when determining different sets of content resources to be cached on different user devices 1610, the device caching engine 1625 may assign content resources to specific user devices 1610 based on the device capabilities and user preferences, as discussed in more in detail below.

When determining the sets of content resources to be cached on different user devices 1610, the device caching engine 1625 may use similar techniques to those discussed above in reference to step 1305. For example, the device caching engine 1625 may use the most recent execution status of a device 1610 and/or the resource usage patterns for the device 1610 to determine the set of content resources that the user is most likely to request and execute in the near future using the device 1610. However, as noted above, changes to such algorithms may be implemented when the device caching engine 1625 is determining multiple sets of resources for multiple devices 1610, rather than just a single set of resources for a single device 1610.

For example, the device caching engine 1625 may take into account the most recent execution status of one user device 1610 (e.g., a desktop computer) when determining the set of content resources to cache on one or more other user devices (e.g., a laptop, smartphone, etc.). For instance, if a user recently executed and completed a sequence of content resources on a first device 1610a (e.g., a number of television series episodes, game levels, eLearning modules, etc.), then the first device 1610a may transmit this execution status data to the device caching engine 1625. The device caching engine 1625 may then use this execution status data from the first device 1610a when determining sets of content resources to cache on other devices 1610b-1610d. In this example, the device caching engine 1625 may select the next unexecuted content resources in the sequence of resources (e.g., the subsequent television episodes, game levels, eLearning modules, etc.) for caching on the other user devices 1610b-1610d, based on the resources previously consumed on the first user device 1610a.

Additionally, changes in the resource execution/consumption patterns of a user which are detected on a first user device 1610a may be used to perform the caching determinations in step 1705 on the other user devices 1610b-1610d. For instance, if the most recent user interaction data received from a first user device 1610a indicate a change in the a user's consumption velocities, remediation rates, or consumption path patterns for one or more CDNs, then the device caching engine 1625 may use the user's updated execution/consumption patterns received from device 1610a to perform the caching determinations on devices 1610b-1610d. As discussed above, changes in a user's consumption velocity, remediation rate, consumption path patterns, etc., may affect the likelihood and timing of subsequent user requests for different content resources in the repositories of one or more CDNs.

In step 1706, the content management server 1620 may transmit the content resources determined in step 1705 to the respective user devices 1610 on which the content management server 1620 has decided to cache content resources for the anticipated time of periods limited or no connectivity. The techniques and processes used in step 1706 may be similar to those discussed above in reference to step 1306.

Figure 18:
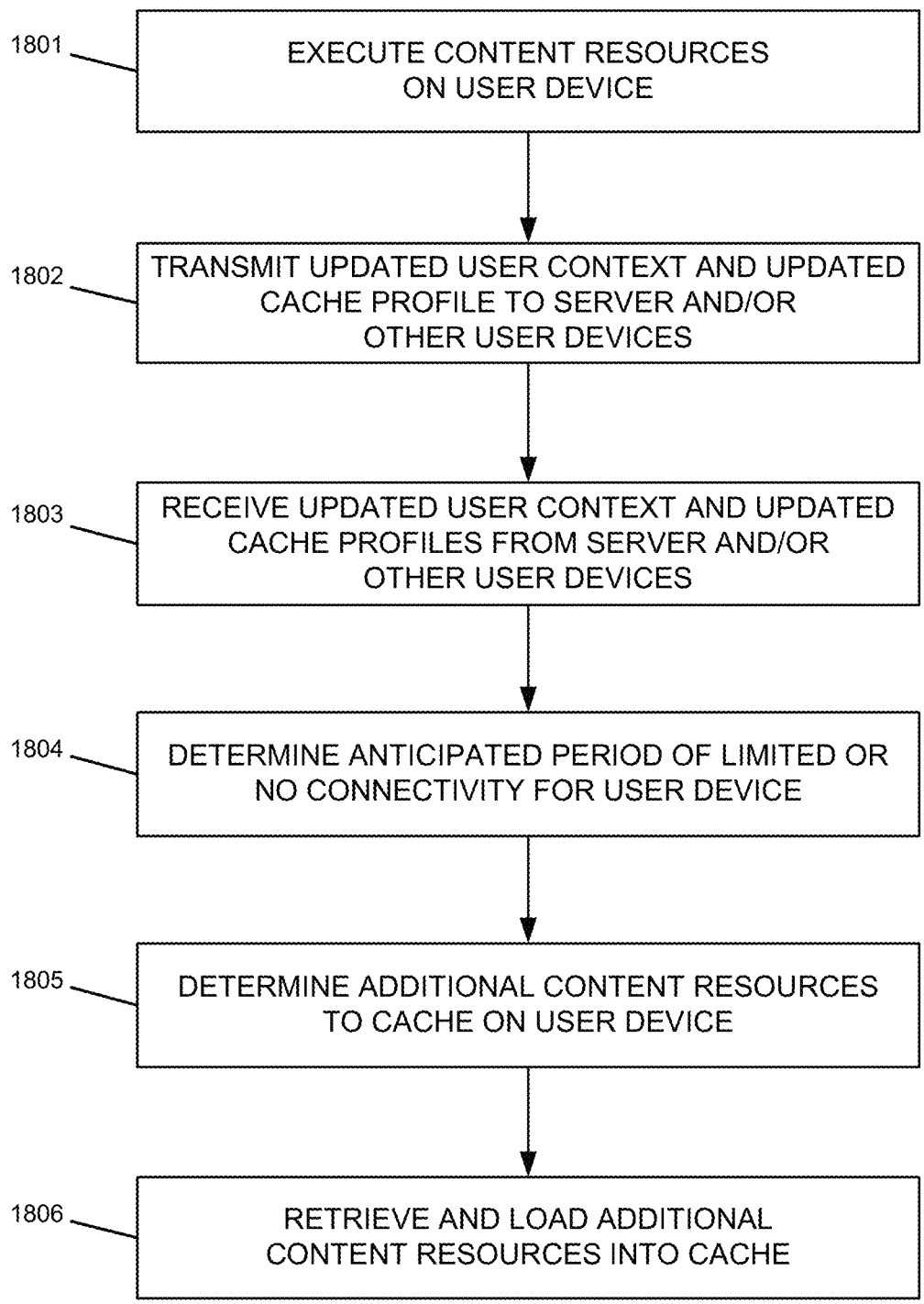
FIG. 18 is a flow diagram illustrating another example process of caching content resources on a plurality of user devices, according to one or more embodiments of the disclosure.

Referring now to FIG. 18, a flow diagram is shown illustrating another process of caching content resources onto multiple user devices. The techniques described in this example process may be similar to those discussed above in FIG. 17. However, the analyses of user context data, cache contents from multiple devices 1610, content execution status and resource consumption patterns, and the determinations of which content resources to be cached, may be performed by individual user devices 1610 in this example, rather than by the content management server 1620. For example, the processes and techniques described below may be performed by the RTS and/or content sequencer 1611, content loader 1615, RTE and/or content executor 1616, and/or cache memory systems 1618 of the individual user devices 1610. However, it should be understood that the processes of evaluating data relating to multiple user devices and performing caching determinations and caching behaviors need not be limited to these specific systems and hardware implementations, but may be performed within other computing environments comprising other combinations of the hardware and software components.

In step 1801, one or more content resources may be played/executed on a user device 1610. For example, as discussed above in reference in to FIGS. 6-9, a content executor component within the user device 1610 may retrieve, load, and execute one or more content resources. The content resources in this example may include adaptive content resources and/or non-adaptive content resources. In either case, user interactions with the content resources may be detected and stored by the user device 1610, along with various types of user feedback, such as click-stream data, user navigation decisions, scores or evaluation results, express feedback, and the like. Such user interaction/feedback data may be received input devices of the user device 1610, for example, keyboard, mouse, touchscreen, voice controls, motion and gesture detectors, etc.

In step 1802, the updated user context following the execution of the content resources in step 1801, along with the current profile/status of the cache 1618 may be compiled and transmitted by the user device 1610. As discussed above, the user context data may include, for example, the execution status of various content resources stored on the device 1610, the user's current location (e.g., playback location, game/module level, current points or rating, etc.) within the resources, the amount of time the user played/executed the resources, a record of the user decisions and other interactions during the execution of the resources, express user feedback (e.g., ratings, discussion posts, etc.) relating to the resources, audio and/or visual cues (e.g., voice feedback, gestures, etc.) and the like. The user context data transmitted in step 1802 also may include the user's updated execution/consumption patterns (e.g., consumption velocity, remediation rate, consumption path patterns, etc.). Additionally, the current profile/status of the cache 1618, which also may be transmitted in this step, may include the set of content resources currently stored within the caches 1618 (e.g., cache memory systems and/or local storage) of the local device. In various embodiments, a user device 1610 may transmit (e.g., periodically or in response to the execution of a resource) the updated user context and the updated cache profile to the content management server 1620 and/or to the other user devices 1610 within the CDN 1600.

In step 1803, the user device may receive one or more updated user contexts and/or updated cache profiles for the other user devices 1610 within the CDN 1600. For example, the data received in step 1803 may be similar and corresponding data to the data transmitted by the user device 1610 in step 1802. The user device 1610 may receive the data in step 1803 from a content management server 1620, or directly from the other user devices 1610 in the CDN 1600. Although multiple different communication processes and techniques may be used for steps 1802-1803, the combination of these steps may indicate the ongoing updating and sharing of user context data and cache 1618 status data across two or more of the user devices 1610 within the CDN 1600.

In step 1804, various components within the user device 1610, such as the content sequencer 1611 executing content algorithms, may determine one or more anticipated time periods of limited or no connectivity applicable to the user device 1610. The techniques and processes performed in step 1804 may be similar or identical to those discussed above in step 1704. However, in this example, the determination of one or more anticipated time windows of limited or no network connectivity may be performed by the user device 1610 rather than by the content management server 1620. Nonetheless, the user device 1610 may take into account some or all of the same data factors as did the content management server 1620 in step 1704, including the network connectivity pattern data and resource usage pattern data for all user devices 1610 in the system 1600, not just the local user device 1610. Thus, the determination in step 1804 may be a user-centric determination that takes into account all of a user's associated devices 1610a-1610d, rather than just the local user device 1610 performing the determination. As an example, a first user device 1610a may determine that an upcoming time window is not an anticipated period of limited or no network connectivity for the user, even though the time window is an anticipated period of limited or no network connectivity for the first device 1610a, because one or more other devices 1610b-1610d are anticipated to be in the user's possession and to retain adequate network connectivity during this time window.

In step 1805, the user device 1610 may determine one or more sets of content resources to be cached on one or more user devices 1610 in advance of the time periods of limited or no connectivity determined above in step 1804. As in step 1804, the determinations in step 1805 may be performed by the content sequencer 1611 executing content algorithms and/or other components within the local user device 1610. The techniques and processes performed in step 1805 may be similar or identical to those discussed above in step 1705. However, as discussed above, the caching determinations in step 1805 may be performed by the user device 1610 rather than by the content management server 1620. Nonetheless, the user device 1610 may take into account some or all of the same data factors as did the content management server 1620 in step 1705, including the user's resource usage patterns on all user devices 1610, the current cache statuses of all user devices 1610, the resource execution/consumption patterns of the user on all user devices 1610, and the like, when selecting the content resources to cache in step 1805. Thus, a local user device 1610a may perform caching determinations for all user devices 1610 in the CDN 1600, or may be configured only to perform caching determinations applicable to the device 1610a itself.

In step 1806, the user device 1610 may request and retrieve the additional content resources determined for caching onto the device 1610 in step 1805. The processes and techniques performed in step 1806 may be similar or identical to those discussed above in step 1306 and discussed further in FIGS. 7-8.

Figure 19:
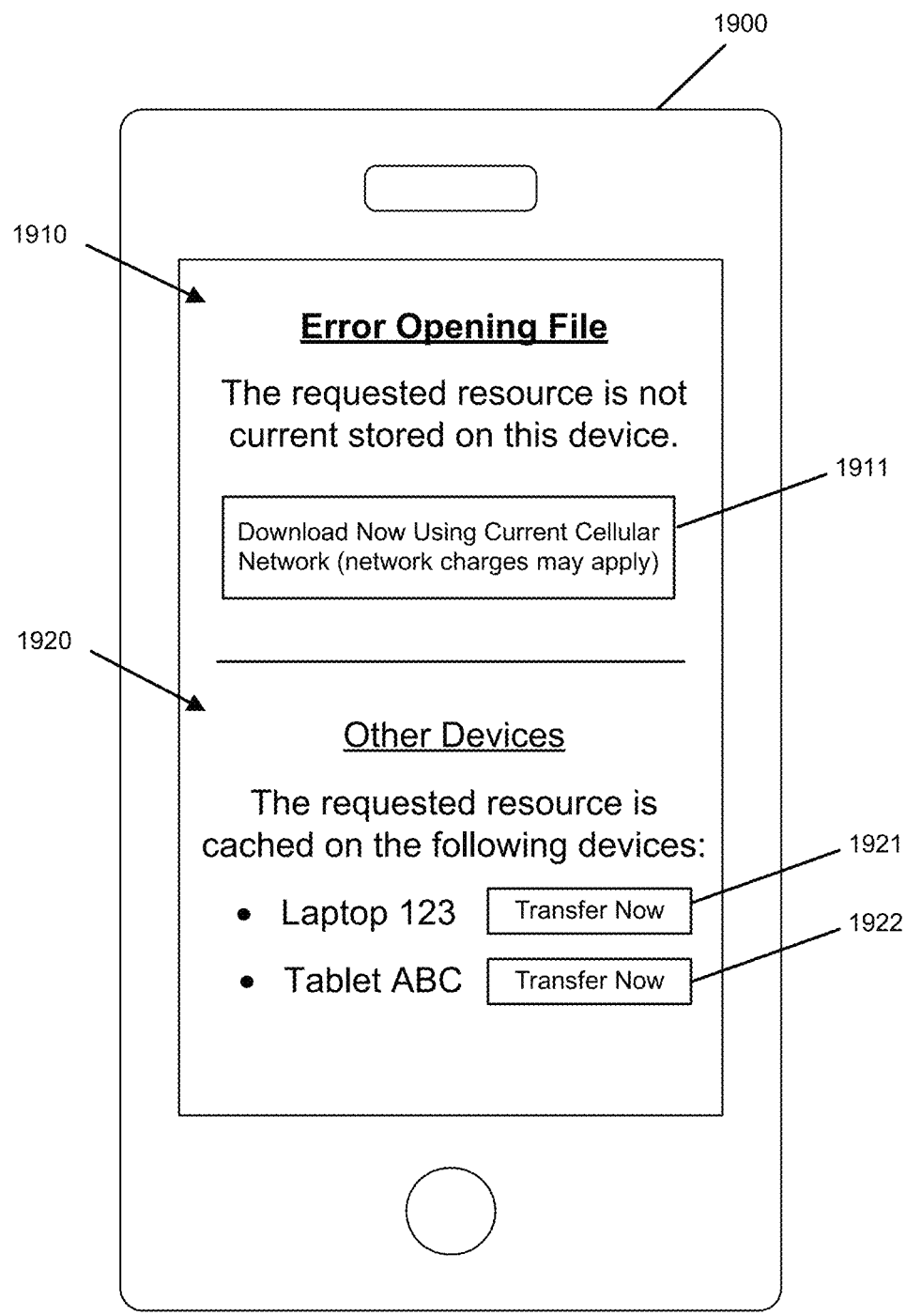
FIG. 19 is an illustrative user interface of a mobile user device in response to a request for an uncached content resource, according to one or more embodiments of the disclosure.

Referring now to FIG. 19, an example user interface is shown for a mobile device 1900, in response to a user request to play/execute a content resource that is not cached on the device. As discussed above, various techniques and processes described herein may be used to provide a seamless user experience for consuming content resources, regardless of the user's network connectivity status. Thus, sets of content resources may be cached on various user devices 1610 in an attempt to anticipate the content requests of users when the user devices have limited or no network connectivity. However, in this example, a user has attempted to play/execute a content resource that has not been cached locally on the user device 1900.

As shown in this example, when a user requests an uncached content resource during a time period of limited or no connectivity, the user device 1900 may respond with one or more different options to provide the requested resource to the user with minimal delay. In some cases, the user device 1900 may initially determine whether or not the requested resource may be downloaded from a content repository within the CDN. In this example, a first user interface area 1910 is rendered on the screen of the mobile device 1900, informing the user that the requested resource is not stored locally on the device, and offering the user an option 1911 to retrieve the resource immediately via the current availability network. In some embodiments, multiple different network options may be displayed in area 1910 for downloading the requested resource, including various network characteristics (e.g., network type, bandwidth, download costs, etc.) that the user may consider before deciding whether or not to download the resource.

User interface area 1920 in this example provides the user with additional options to initiate a transfer of the resource from another one of the user's associated devices 1610. As discussed above, in certain embodiments caching determinations may be coordinated among multiple user devices, for example, in order to treat the individual cache systems 1618 of multiple user devices 1610 collectively as a single cache. Some such systems may attempt to eliminate duplicate cached resources among multiple devices 1610 available to the user (e.g., a laptop, a tablet, and a smartphone), thereby creating a multi-device cache capable of storing larger amounts of content resources for periods of time when the user has limited or no connectivity. In such scenarios, as shown in FIG. 19, a user may potentially request a resource that has been cached on one or more other user devices 1610, but not on the device 1900 on which the user has attempted to play/execute the resource.

Accordingly, as shown in this example, a user interface area 1920 may be presented to inform the user on which other devices the requested resource may be found. In some cases, these other devices may be readily available to the user, and the user may simply choose to switch devices and execute the resource on the device where it is already cached. In other cases, the user may be presented with options 1921-1922 to initiate a device-to-device file transfer to move the requested resource onto the current mobile device 1900. Such transfers may be performed using local WiFi networks, LANs, Bluetooth®, or other communication protocols described herein. In some embodiments, the mobile device 1900 may be configured to automatically initiate the device-to-device transfer in response to the user's request, and the transfer may be performed as a background process transparent to the user. Additionally, in some embodiments, when a device-to-device transfer is performed for a requested resource, the user device 1900 may initiate another transfer of one or more other content resources in the opposite direction, in order to free up space on the user device 1900 for the requested resource.

In some embodiments, the caching determinations and caching behaviors described herein may be further based on the capabilities of the various user devices in the system. As discussed below, certain content resources may request (or even require) user devices having certain processing, input, and/or output capabilities, so that the content resources may be optimally rendered for the user. For example, certain content resources may require specific types of processors, graphics components, and network components in order to be optimally executed on a user device. Additionally or alternatively, various content resources may require specific output capabilities (e.g., LCD display screens, minimum screen sizes, color displays, video, audio, graphics, etc.) and/or specific input capabilities (e.g., keyboard, mouse, touchscreen, voice control, gesture recognition, etc.) in order to be optimally executed on a user device. Further, in some embodiments, users may establish user-specific preferences for executing specific types of content resources on specific types of user devices.

Figure 20:
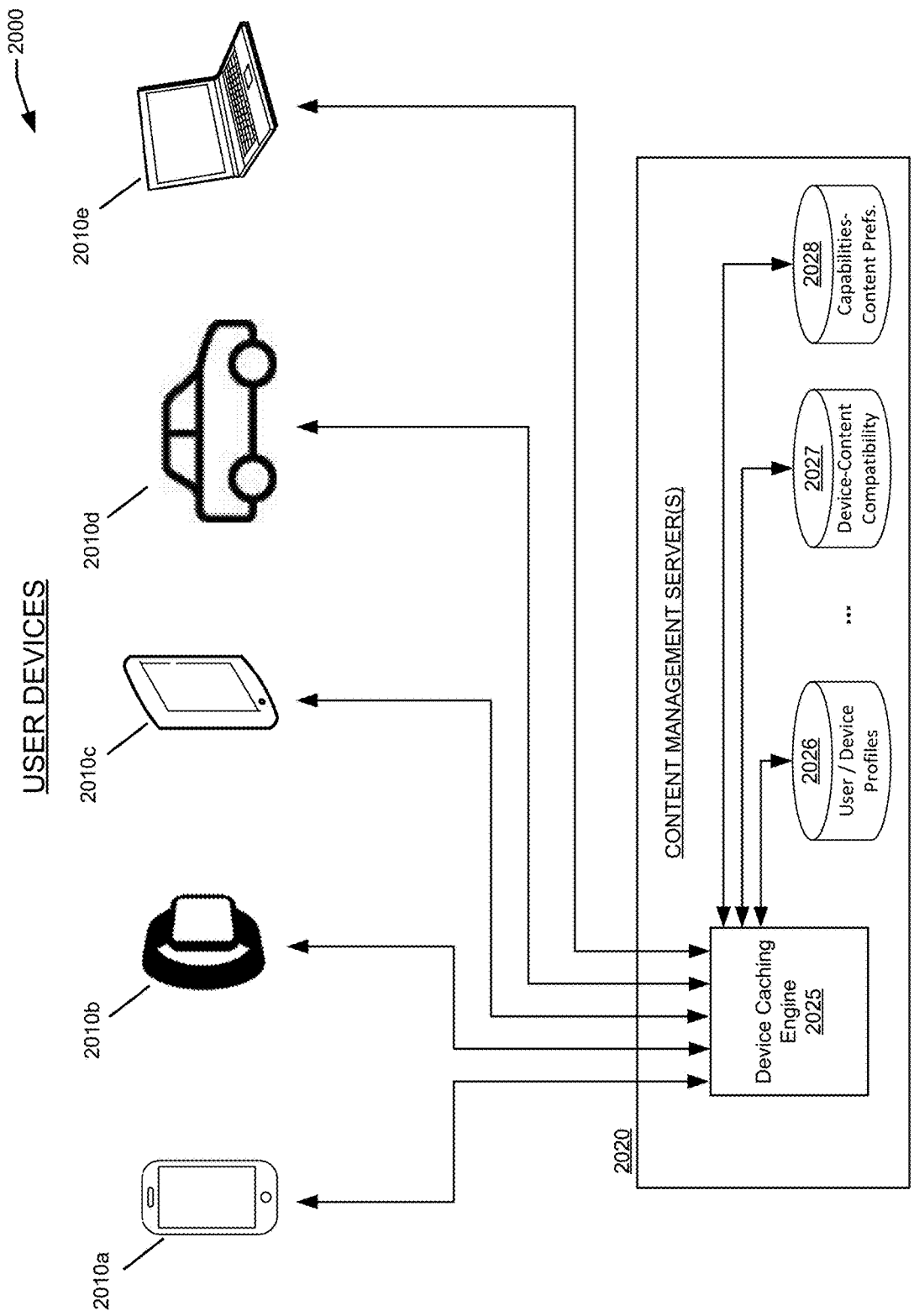
FIG. 20 is a block diagram illustrating another example of a cache system including multiple user devices, according to one or more embodiments of the disclosure.

Referring now to FIG. 20, a block diagram is shown illustrating another example of a cache system 2000, including multiple user devices 2010a-2010e, and one or more content management servers 2020. Cache system 2000 in this example may correspond to a content distribution network similar or identical to cache system 1600 described above in reference to FIGS. 16-19. As in previous examples, cache system 2000 may be integrated within or configured to operate in collaboration with one or more CDNs 100, including professional training and eLearning CDNs, media distribution CDNs, gaming CDNs, enterprise application systems, websites and other Internet-based systems, etc. Thus, content management servers 2020 may include one or more content servers 112, content management servers 102, and/or data store servers 104, and the like. In order to perform the features described herein, each of the components and sub-components discussed in the example cache system 2000 (or CDN 2000) may correspond to a single computer server or a complex computing system including a combination of computing devices, storage devices, network components, etc. Each of these components and their respective subcomponents may be implemented in hardware, software, or a combination thereof. Further, certain components may include special purpose hardware devices and/or special purpose software, such as run-time services, content sequencers, content loaders, run-time environments, and cache memory systems within the user devices 2010, as well as the device caching engine 2025 and various data stores 2026-2028 within the content management server 2020.

Similar to CDN 1600 discussed above, the user devices 2010 in CDN 2000 may include any types of computing devices containing any of the hardware, software, and networking components discussed above in connection with user devices 106, 610, 1210, 1610, etc. In this example, the user devices 2010 include several different types of mobile devices, including a smartphone 2010a, a smart watch 2010b, a tablet computer 2010c, a vehicle-based device 2010d, and a laptop computer 2010e. The CDN 2000 may include non-mobile user devices as well, such as desktop computers, servers, television set-top boxes home gaming systems, and the like. Although not shown in this example, each user device 2010 may include some or all of the components of the user devices discussed above, such as run-time services (RTS) including content sequencers, content loaders, a run-time environments including content executors, and/or cache memory systems/local storage devices.

As in the previous examples, the user devices 2010 in CDN 2000 also may be associated (exclusively or non-exclusively) with the same user. Although such associations may be exclusive or non-exclusive. For both the exclusive or non-exclusive user devices 2010 associated a user, the system 2000 may determine when the user is in possession of (e.g., currently using or located nearby) each device 2010, as opposed to when another user is in possession of the device 2010 or when the device 2010 is inaccessible to all users. Such determinations may be performed by the user devices 2010 themselves and/or the content management server 2020, as described above. Additionally, for each user device 2010, resource usage patterns as well as network connectivity patterns may be determined, using similar techniques to those discussed above in reference to FIGS. 12-15. Additionally, for each device 2010, device-user patterns may be determined to identify which users are typically in possession of and/or using each user device 2010 at which times. As with resource usage patterns and network connectivity patterns, the device-user patterns may include times/days sections mapped to associated users and corresponding probabilities.

Content management server 2020 may be similar or identical to content management servers 620 and/or 1620, and thus may include one or more repositories for CDN content resources (e.g., content servers 112), data store servers 104, administrative servers 116, and other CDN servers and devices discussed above. In this example, content management server 2020 may also include a device/user profile data store 2026, a resource usage pattern data store (not shown) and/or a device network connectivity pattern data store (not shown), which may be similar to the corresponding data stores described above in reference to FIG. 16.

Additionally, in this example, content management server 2020 includes a device-content compatibility data store 2027, and a capabilities-content preferences data store 2028. The device-content compatibility data store 2027 may store data identifying the various compatibilities between types of content resources and technical capabilities/features of user devices 2010. For example, if a particular content resource requests (or requires) a touch screen to facilitate user interactions, then user devices 2010a (smartphone), 2010c (tablet), and 2010d (vehicle-based system) may be compatible with the resource, while user devices 2010b (smart watch) and 2010e (laptop) might not be compatible with the resource. As another example, if a content resource requires 3D accelerated graphic capabilities, then user devices 2010e (laptop) and 2010c (tablet) may be compatible with the resource, while user devices 2010a (smartphone), 2010b (smart watch), and 2010d (vehicle-based system) might not be compatible with the resource. Referring briefly to FIG. 21, an illustrative table 2100 is shown including example device-content compatibility data for another set of user devices. The device-content compatibility data in these examples may be predetermined automatically via device-server communication within the CDN 2000, and/or manually by user inputs defining the compatibilities.

The capabilities-content preferences data store 2028 may be implemented as a second data store or integrated within the device-content compatibility data store 2027 or other data stores described herein. The capabilities-content preferences data store 2028 may store a set of user-specific preferences for playing/executing and interacting with different types of content resources on different devices. For example, although a certain type of content resource may be executed on multiple different user devices 2010, the user may prefer executing such content resources on one specific device (or device type). Such preferences may be specific to individual users or groups of related users.

In some embodiments the preferences may be expressly defined by the user (e.g., via predefined user preferences, express user feedback during execution, etc.), while in other embodiments the preferences may be automatically determined by the user devices 2010 and/or content management servers 2020. For example, user statistics may be collected and analyzed to determine which user devices 2010 are preferred or optimal for the user to execute different types of content resources. The user statistics that may be analyzed in such cases may include, for example, the user's consumption velocities, remediation rates, scores and evaluations, and the like. To illustrate, if a user's consumption velocity for a certain type of resource (e.g., text, interactive video, graphics-based games or eLearning modules, etc.) is consistently higher when using a specific user device 2010 (or class of user devices) in comparison to other devices 2010, then the system may automatically assign a device capability-content preference linking to the resource type and device (or device type). Similar automated processes and techniques may be used to determine user device preferences for specific content types based on a user's remediation rate, user game scores, test or evaluation scores, facial expressions, gestures, audio feedback, and the like. Referring briefly to FIG. 22, an illustrative table 2200 is shown including example preference ratings for different user devices 2010 with respect to different types of CDNs and content resources.

Figure 23:
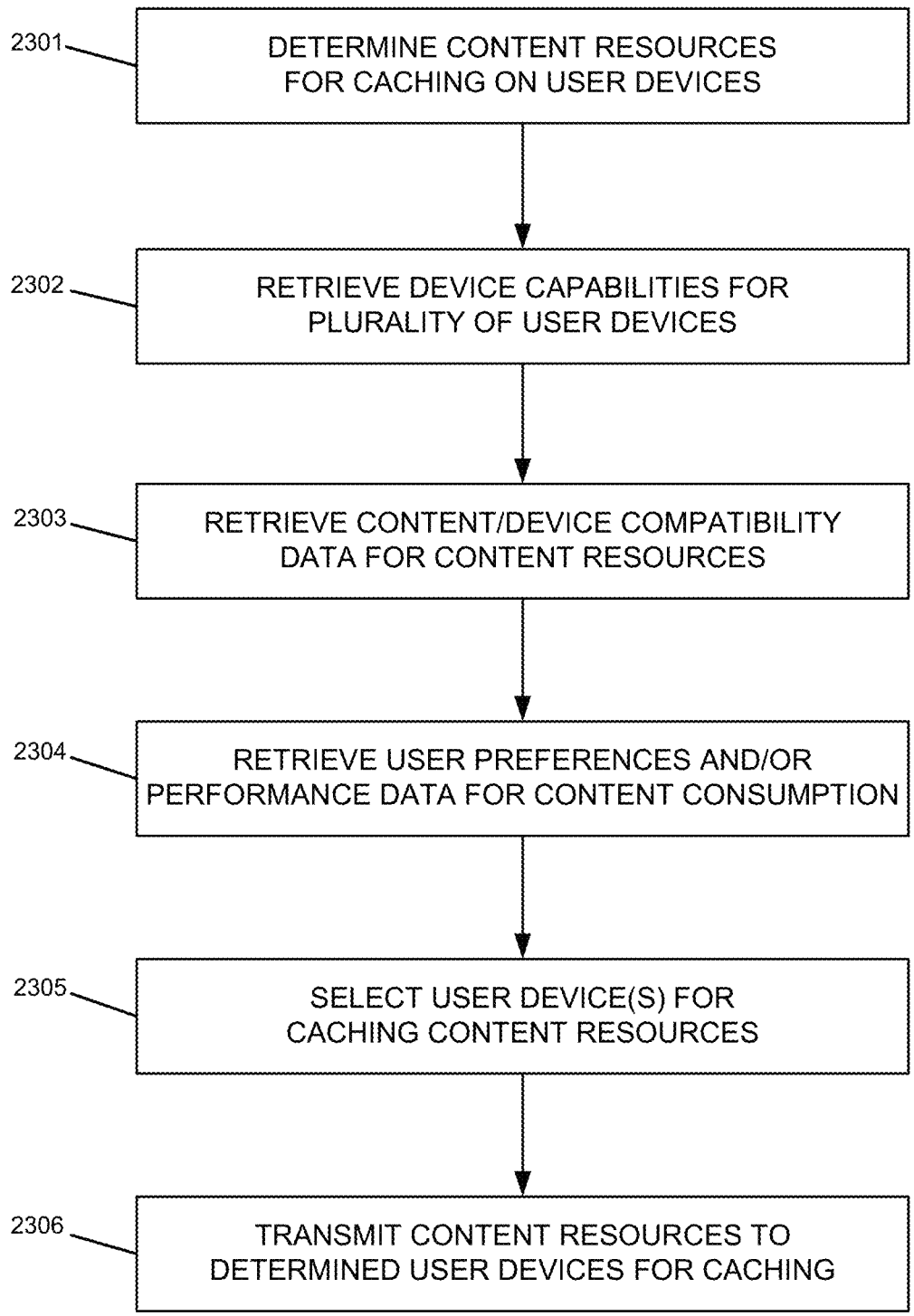
FIG. 23 is a flow diagram illustrating an example process of caching content resources on a plurality of user devices, according to one or more embodiments of the disclosure.

Referring now to FIG. 23, a flow diagram is shown illustrating another process of caching content resources onto multiple user devices. As described below, the steps in this process may be performed by one or more components in the example cache system 2000, such as the device caching engine 2025 within the content management server 2020. However, it should be understood that the processes of evaluating data relating to multiple user devices, including device capabilities and user content-device preferences, and performing the corresponding caching determinations need not be limited to the specific systems and hardware implementations described above, but may be performed within other computing environments comprising other combinations of the hardware and software components.

In step 2301, the content management server 2020 may determine a set of content resources to be cached on multiple different user devices 2010. Thus, step 2301 may include some or all of the techniques and processes described above in reference to steps 1701-1705. For example, the content management server 2020 may retrieve data such as user and device profiles, resource usage patterns, and network connectivity patterns for each user device 2010, before determining one or more anticipated periods of limited or no connectivity across all user devices 2010, and then finally determining one or more sets of content resources to be cached on the user devices 2010.

In step 2302, the content management server 2020 may retrieve the device capabilities for each of the user devices 2010 associated with the user in the CDN 2000. The data retrieved in step 2302 may correspond to the data in data store 2026, and may include hardware, software, network, graphics, and other device capabilities for each user device 2010 associated with the relevant user. Certain examples of input and output device capabilities are shown in FIG. 21, but it should be understood that these examples are non-limiting and illustrative only. Additionally, further device capabilities besides I/O capabilities, such as the number of characteristics of the device processors, the types and amount of device memory, the graphics processors and drivers, and the network capabilities and security/integration features of each user device 2010.

In step 2303, the content management server 2020 may retrieve content-device compatibility data associated with the content resources determined in step 2301. The data retrieved in step 2303 may correspond to the data in data store 2027, and may include various compatibilities between types of the content resources determined in step 2301, and the technical capabilities/features of each user device 2010. Certain examples of compatibility data between content types and device capabilities are shown in FIG. 22, but it should be understood that these examples are non-limiting and illustrative only.

In step 2304, the content management server 2020 may retrieve user-specific preferences and/or performance data for content execution/consumption by different user devices 2010. The data retrieved in step 2304 may correspond to the data in data store 2028, and may include a set of user preferences for playing/executing and interacting with different types of content resources on different devices. As discussed above, in some cases the preferences/performance data retrieved in step 2304 may be manually defined by the user, for example, via predefined user preferences, express user feedback, and the like. In other cases, the preferences/performance data may be determined automatically by the content management server 2020 based on user statistics collected in relation to the user's previous execution of different types of content resources on different user devices 2010.

In step 2305, the content management server 2020 may determine which content resources determined in step 2301 may be cached on which user devices 2010. The determination in step 2305 may be based on one or more of the device capabilities data received in step 2302, the content-device compatibility data received in step 2303, and the user-specific preferences and/or performance data received in step 2304. Thus, each content resource that has been selected for caching on a user device 2010 may be assigned to a preferable (and potentially optimal) user device 2010 with respect to the technical capabilities and features of the device 2010, as well as the user preferences and/or user feedback statistics associated with the user device 2010 and the resource type.

Although this example relates to a scenario in which the content management server 2020 may select between multiple different user devices 2010 for caching a selected content resource, similar techniques and processes may be applied to select between multiple different content resource for caching on a single user device 2010. For example, in embodiments in which a set of content resources is determined for caching on a single user device, the device capabilities, content-device compatibility data, and/or user-specific preferences and/or performance data may be used to determine which resources to cache on the device. Such determinations may be performed instead of or in addition to determinations based on usage probabilities of the different content resources.

In step 2306, the content management server 2020 may transmit the content resources determined in step 2301 to the appropriate user devices 2010 as determined in step 2305. The techniques and processes used in step 2306 may be similar to those discussed above in reference to steps 1306 and 1706.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. An adaptive cache system comprising computer-executable program instructions that, when executed by one or more processing units of a mobile device of a first user of an electronic learning system, cause the mobile device to:

monitor execution, in a run-time environment of the mobile device, of content resources comprising requested electronic learning materials to produce resource consumption data describing timing, sequence, and completion of the requested electronic learning materials, the content resources being obtained from one or more content servers of an electronic learning system, the one or more content servers storing electronic learning materials, including the requested electronic learning materials, arranged as a plurality of courses each comprising a corresponding set selected from the electronic learning materials, the content resources having a plurality of content types including text-based resources, video-based resources, and interactive software components comprising assignments and evaluations that must be completed by users of the electronic learning system in order to complete the course, the resource consumption data representing consumption by the first user of the electronic learning materials based on the plurality of content types;
determine a user context of the first user based in part on the resource consumption data;
identify, based on the user context, additional content resources for caching on the user device, the additional content resources selected from the electronic learning materials, wherein identifying the additional content resources for caching comprises:
  determining a plurality of possible consumption paths through the at least one non-linear content resource the plurality of possible consumptions paths being determined based on a network connectivity pattern of the first user in association with the timing, sequence, and completion of the requested electronic learning materials;
  for each of the possible consumption paths, determining a likelihood based on the first user context that the first user will follow the possible consumption path when consuming the non-linear content resources; and
  determining the additional content resources to cache, based on the determined likelihoods for each of the possible consumption paths for the first user;
request the additional content resources from the one or more content servers;
receive the additional content resources; and
store the received additional content resources into a local memory of the user device.

2. The adaptive cache system of claim 1, wherein determining the user context for the first user comprises determining a consumption velocity for the first user, based on user inputs associated with the first user.

3. The adaptive cache system of claim 1, wherein determining the user context for the first user comprises determining a remediation rate for the first user, based on the user inputs associated with the first user.

4. The adaptive cache system of claim 1, wherein the additional content resources include at least one non-linear content resource.

5. The adaptive cache system of claim 1, wherein to identify the additional content resources for caching, the instructions, when executed, further cause the mobile device to:
  determine a network connectivity profile describing connection patterns of the mobile device to the one or more content servers via a computer network;
  determine a first time window based on the network connectivity profile;
  determine an anticipated amount of content consumption by the first user during the first time window, based on the user context; and
  identify the additional content resources for caching, further based on the user context and the anticipated amount of content consumption.

6. The adaptive cache system of claim 5, wherein determining the additional content resources for caching comprises determining an amount of the additional content resources to cache within the cache memory system, based on the user context.

7. The adaptive cache system of claim 6, wherein determining the first time window based on the network connectivity profile comprises analyzing network connectivity pattern data for one or more user devices associated with the first user, the network connectivity pattern data described by the network connectivity profile, to determine that the one or more user devices have limited or no network connectivity to the electronic learning system during the first time window.

8. The adaptive cache system of claim 5, wherein determining the anticipated amount of content consumption by the first user during the first time window comprises:
  retrieving data corresponding to a pattern of the first user for consuming content resources; and
  comparing at least one of a current time of the day or a current day of the week to the pattern of the first user for consuming content resources.

9. A method comprising:
requesting, by a user device comprising a cache system, adaptive content resources from one or more content servers of an electronic learning system, the one or more content servers storing electronic learning materials arranged as a plurality of courses each comprising a corresponding set of content resources selected from the electronic learning materials, the content resources having a plurality of content types including text-based resources, video-based resources, and interactive software components comprising assignments and evaluations that must be completed by users of the electronic learning system in order to complete the course;
receiving, by the user device, one or more subsets of the content resources as the adaptive content resources requested from the one or more content servers;
receiving, via one or more input devices of the user device, a plurality of requests, entered by a first user of the electronic learning system, to execute various content resources of the adaptive content resources;
in response to each of the plurality of requests, executing, by the user device, the corresponding content resources identified by the requesting one or more output devices;
during execution of the various content resources, monitoring, by the user device, the execution to produce resource consumption data describing timing, sequence, and completion of the electronic learning materials, the resource consumption data representing consumption by the first user of requested electronic learning materials having each of the plurality of content types;
determining, by the user device, a first user context for the first user, the first user context based at least in part on the resource consumption data;
identifying, by the user device based on the first user context, additional content resources from the electronic learning materials, wherein identifying the additional content resources for caching comprises:
  determining a plurality of possible consumption paths of the first user through the non-linear content resources, the plurality of possible consumptions paths being determined based on a network connectivity pattern of the first user in association with the timing, sequence, and completion of the requested electronic learning materials;
  for each of the possible consumption paths, determining a likelihood based on the first user context that the first user will follow the possible consumption path when consuming the non-linear content resources; and
  determining the additional content resources to cache, based on the determined likelihoods for each of the possible consumption paths for the first user;
requesting, by the user device, the additional content resources from the one or more content servers;

receiving, by the user device, the additional content resources; and storing, by the user device, the additional content resources into the cache system.

10. The method of claim 9, wherein determining the first user context for the first user comprises determining, based on the resource consumption data, a consumption velocity for the first user.

11. The method of claim 9, wherein determining the first user context for the first user comprises determining, based on the resource consumption data, a remediation rate for the first user.

12. The method of claim 9, wherein the adaptive content resources, and the additional content resources determined for caching, each include at least one non-linear content resource.

13. The method of claim 9, wherein identifying the additional content resources for caching comprises determining an amount of the additional content resources to cache within the cache system of the user device, based on the first user context.

14. The method of claim 13, wherein determining the amount of the additional content resources to cache within the cache system of the user device comprises:

determining a network connectivity profile associated with the user device; determining a first time window based on the network connectivity profile; determining an anticipated amount of content consumption by the first user during the first time window, based on the first user context; and determining the amount of the additional content resources to cache within the cache memory of the user device, based on the anticipated amount of content consumption by the first user during the first time window.

15. The method of claim 14, wherein determining the anticipated amount of content consumption by the first user during the first time window comprises:

retrieving data corresponding to a pattern of the first user for consuming content resources; and comparing at least one of a current time of the day or a current day of the week to the pattern of the first user for consuming content resources.

16. A computer-program product tangibly embodied in a non-transitory machine-readable storage medium, including instructions configured to cause one or more data processors to perform actions including:

requesting one or more adaptive content resources from one or more content servers of an electronic learning system;

receiving the requested adaptive content resources from the one or more content servers, the requested adaptive content resources being selected from electronic learning materials stored by the one or more content servers, and the requested adaptive content resources having a plurality of content types associated with the corresponding electronic learning materials that must be completed by users of the electronic learning system to electronically complete one or more education or training courses;

storing the received adaptive content resources into a cache system of a user device;

receiving a request to execute the adaptive content resources;

executing the adaptive content resources using one or more output devices;

monitoring user inputs entered by a first user of the electronic learning system into the user device, the user inputs associated with the execution of the adaptive content resources;

determining a first user context for the first user, based on the user inputs and the execution of the adaptive content resources; and determining one or more additional content resources for caching on the user device, based on the first user context, wherein determining the additional content resources for caching comprises:

determining a plurality of possible consumption paths of the first user through non-linear content resources, the plurality of possible consumptions paths being determined based on a network connectivity pattern of the first user in association with a timing, sequence, and completion of the electronic learning materials;

for each of the possible consumption paths, determining a likelihood based on the first user context that the first user will follow the possible consumption path when consuming the non-linear content resources; and determining the additional content resources to cache, based on the determined likelihoods for each of the possible consumption paths for the first user.

17. The computer-program product of claim 16, wherein determining the first user context for the first user comprises determining a consumption velocity for the first user, based on one or both of the user inputs and the execution of the adaptive content resources.

18. The computer-program product of claim 16, wherein determining the first user context for the first user comprises determining a remediation rate for the first user, based on one or both of the user inputs and the execution of the adaptive content resources.

* * * * *